US009507573B2

(12) United States Patent
Masuda

(10) Patent No.: US 9,507,573 B2
(45) Date of Patent: Nov. 29, 2016

(54) DRIVER PROGRAM GENERATING APPARATUS, DRIVER PROGRAM GENERATING METHOD, DRIVER PROGRAM GENERATING PROGRAM, AND DRIVER PROGRAM

(71) Applicant: Konica Minolta, Inc., Tokyo (JP)

(72) Inventor: Tetsuya Masuda, Nishinomiya (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/740,803

(22) Filed: Jun. 16, 2015

(65) Prior Publication Data
US 2015/0370543 A1 Dec. 24, 2015

(30) Foreign Application Priority Data

Jun. 18, 2014 (JP) ................................ 2014-125817

(51) Int. Cl.
G06F 9/44 (2006.01)
(52) U.S. Cl.
CPC .. G06F 8/38 (2013.01); G06F 8/71 (2013.01)
(58) Field of Classification Search
CPC .................................. G06F 8/38; G06F 8/67
USPC .......... 717/106–112, 116, 120–121
See application file for complete search history.

(56) References Cited

U.S. PATENT DOCUMENTS

| 6,049,665 | A * | 4/2000 | Branson | G06F 8/24 717/108 |
|---|---|---|---|---|
| 6,184,860 | B1 * | 2/2001 | Yamakawa | G06F 3/04842 715/823 |
| 6,502,234 | B1 * | 12/2002 | Gauthier | G06F 8/34 717/101 |
| 6,925,632 | B2 * | 8/2005 | Shiu | G06F 8/36 717/104 |
| 7,017,146 | B2 * | 3/2006 | Dellarocas | G06F 8/20 717/106 |
| 7,516,439 | B2 * | 4/2009 | Robinson | G06F 8/00 707/999.101 |
| 7,810,069 | B2 * | 10/2010 | Charisius | G06F 8/20 717/106 |
| 8,185,867 | B2 * | 5/2012 | Robinson | G06F 8/00 717/105 |
| 8,924,921 | B2 * | 12/2014 | Rush | G06F 17/30371 703/22 |
| 8,972,928 | B2 * | 3/2015 | Weigert | G06F 8/10 717/106 |
| 2004/0093491 | A1 | 5/2004 | Ebata | |

FOREIGN PATENT DOCUMENTS

JP 2004-078745 A 3/2004

OTHER PUBLICATIONS

Sibley et al, "A Data Definition and Mapping Language", ACM, vol. 16. No. 12, pp. 750-759, 1973.*
Daini et al, "A Data Definition and Mapping Language for Numerical Data Bases", ACM, pp. 418-432, 1980.*
Tomasek et al, "On Web Services UI in User Interface Generation in Standalone Applications" ACM, pp. 363-368, 2015.*
Cappiello et al, "A UI-Centric Approach for the End-User Development of Multidevice Mashups" ACM Transactions on the Web, vol. 9, No. 3, Article 11, pp. 1-40, 2015.*

(Continued)

Primary Examiner — Anil Khatri
(74) Attorney, Agent, or Firm — Osha Liang LLP

(57) ABSTRACT

A server includes a non-transitory computer readable storage medium and a processor. The computer readable storage medium stores UI definition data, command definition data, and first and second association information. The processor obtains a driver program and generates a correction program. The correction program is generated by changing the UI definition data and the command definition data included in the driver program.

12 Claims, 18 Drawing Sheets

(56) References Cited

OTHER PUBLICATIONS

Viswanathan et al, "Automating UI Guidelines Verification by Leveraging Pattern Based UI and Model Based Development", ACM, pp. 4733-4742, 2010.*

Kuo et al, "Generating Form-Based User Interfaces for XML Vocabularies", ACM, pp. 58-60, 2005.*

Franz et al, "Improved Embedding Based on a Set of Cover Images", ACM, pp. 141-150, 2009.*

Kadav et al, "Understanding Modern Device Drivers" ACM, pp. 87-98, 2012.*

* cited by examiner

FIG. 9

INTER-FUNCTION DEFINITION DATA

| | |
|---|---|
| cmd001=IF((UI DEFINITION DATA 1=1) & (UI DEFINITION DATA 11=2)=(UI DEFINITION DATA 11=0)) |
| cmd002=IF((UI DEFINITION DATA 2=1) & (UI DEFINITION DATA 12=2)=(UI DEFINITION DATA 12=0)) |
| cmd003=IF((UI DEFINITION DATA 3=1) & (UI DEFINITION DATA 13=2)=(UI DEFINITION DATA 13=0)) |
| cmd004=IF((UI DEFINITION DATA 4=1) & (UI DEFINITION DATA 14=2)=(UI DEFINITION DATA 14=0)) |

FIRST ASSOCIATION INFORMATION

| NAME | ASSOCIATED DATA |
|---|---|
| UI DEFINITION DATA 1 | COMMAND DEFINITION DATA 1 |

FIG. 12

SECOND ASSOCIATION INFORMATION

| NAME | ASSOCIATED DATA | |
|---|---|---|
| COMMAND DEFINITION DATA 1 | UI DEFINITION DATA 1 | UI DEFINITION DATA 5 |

DRIVER PROGRAM GENERATING APPARATUS, DRIVER PROGRAM GENERATING METHOD, DRIVER PROGRAM GENERATING PROGRAM, AND DRIVER PROGRAM

The entire disclosure of Japanese Patent Application No. 2014-125817 filed on Jun. 18, 2014 including description, claims, drawings, and abstract are incorporated herein by reference in its entirety.

BACKGROUND

Field of the Invention

One or more embodiments of the invention relate to a driver program generating apparatus, a driver program generating method, a driver program generating program, and a driver program, and more particularly, to a driver program generating apparatus that generates a driver program controlling an image forming apparatus, a driver program generating method executed by the driver program generating apparatus, a driver program generating program, and a driver program generated using the driver program generating method.

Description of the Related Art

In order for a personal computer (hereinafter, referred to as a "PC") to control an image forming apparatus that is represented by a multi-function peripheral, it is necessary to install a printer driver program corresponding to the image forming apparatus. Such a printer driver program, commonly, is supplied from a manufacturer that provides the image forming apparatus.

As above, in order for the printer driver program to respond to an image forming apparatus, the type of printer driver program is different depending on the model of the image forming apparatus. Particularly, in a case where a new function is added to the image forming apparatus, a version of the printer driver program that corresponds to the added function is developed.

In JP 2004-78745 A, an information processing apparatus, to which a plurality of control programs that can execute an image process and a control process corresponding to the function and the characteristics of an image forming apparatus are installed, capable of supplying print data to a peripheral device connected thereto is disclosed. The information processing apparatus includes: an acquisition unit that acquires information representing the model of the image forming apparatus; a management unit that manages information representing versions of a plurality of control programs corresponding to the model represented by the information acquired by the acquisition unit; and a selection unit that selects a control program of a latest version from among versions of the control programs managed by the management unit.

However, in a conventional information processing apparatus, a control program of a new version is prepared in advance, and, in a case where the function and the characteristics of the image forming apparatus are changed, it is necessary for the manufacturer side to generate a control program of a new version. In addition, the control program of a new version is generated only by a manufacturer of the image forming apparatus, and there a user cannot change the control program.

SUMMARY

In view of the description above, one or more embodiments of the invention may provide a driver program generating apparatus capable of easily generating a new driver program.

One or more embodiments of the invention may provide a driver program generating method capable of easily generating a new driver program.

One or more embodiments of the invention may provide a driver program generating program capable of easily generating a new driver program.

One or more embodiments of the invention may provide a driver program capable of easily responding to a change in the function of an image processing apparatus that is a control target.

One or more embodiments of the invention may provide a driver program generating apparatus comprising: an access unit configured to access a definition database including a plurality of pieces of UI definition data and a plurality of pieces of command definition data, first association information associating each of the plurality of pieces of UI definition data with one of the plurality of pieces of command definition data, and second association information associating each of the plurality of pieces of command definition data with one or more of the plurality of pieces of UI definition data; each of the plurality of pieces of UI definition data corresponding to one of a plurality of functions and defining one or more setting values settable for the function and a display command used for receiving the one or more setting values, each of the plurality of pieces of command definition data corresponding to one of a plurality of functions, corresponding to one or more setting values settable for the function, and defining one or more print commands common to a plurality of kinds of image forming apparatuses, a program acquiring unit configured to acquire a driver program including at least a part of the plurality of pieces of UI definition data and at least a part of the plurality of pieces of command definition data as a program before change; a change unit configured to generate a program after change acquired by changing the plurality of pieces of UI definition data and the plurality of pieces of command definition data included in the acquired program before change according to a user's direction; and a correction unit configured to generate a correction program by changing a part of a plurality of pieces of command definition data included in the program after change so as to match a combination of a plurality of pieces of UI definition data and the plurality of pieces of command definition data included in the program after change with association determined based on the first association information and the second association information.

According to embodiments of the present invention, a program after change is generated by changing the plurality of UI definition data and the plurality of command definition data included in the program before change according to a user's direction, and a correction program is generated by changing a part of a plurality of pieces of command definition data included in the program after change so as to match a combination of a plurality of pieces of UI definition data and the plurality of pieces of command definition data included in the program after change with association determined based on the first association information and the second association information. Accordingly, the UI definition data and the command definition data after the change made by the user can match with each other. As a result, a driver program generating apparatus capable of easily generating a new driver program can be provided.

The driver program generating apparatus further comprises a control information generating unit configured to generate control information including command definition data identification information used for identifying the command definition data and prohibition information representing that a determination on whether or not the setting value is set based on one or more of the one or more pieces of the UI definition data corresponding to a function corresponding to the command definition data is not executed for predetermined command definition data among the plurality of pieces of command definition data included in the program after change changed by the change unit.

In accordance with one or more embodiments of the invention, since the control information includes the prohibition information representing that a determination on whether or not the setting value is set based on one or more of the one or more pieces of the UI definition data is not executed for predetermined command definition data included in the program after change, the determination on whether or not the setting value is set can be prevented from being executed based on the predetermined command definition data. As a result, an unnecessary determination process is not executed by the computer that executes the driver program, and accordingly, a driver program capable of reducing the load can be generated.

The change unit is configured to include: a UI deletion unit configured to delete one or more of the plurality of pieces of UI definition data included in the acquired program before change; and a UI addition unit configured to add one of the plurality of pieces of UI definition data included in the definition database.

The correction unit is configured to include: a candidate extracting unit configured to extract command definition data associated with only one or more pieces of the UI definition data other than deleted UI definition data based on the second association information as candidate command definition data in a case where the command definition data associated with the UI definition data deleted from the program before change based on the first association information is associated with the one or more pieces of the UI definition data other than the deleted UI definition data based on the second association information in the program after change; a replacement unit configured to delete command definition data corresponding to the deleted UI definition data and add the candidate command definition data in a case where the candidate command definition data is extracted; and an addition correction unit configured to add command definition data associated with added UI definition data based on the first association information to the program after change in a case where the command definition data associated with the UI definition data added to the program before change in the program after change based on the first association information is not included in the program after change.

In accordance with one or more embodiments of the invention, the command definition data associated with the UI definition data included in the program after change can be added.

The change unit is configured to include: a command deletion unit configured to delete one or more of the plurality of pieces of command definition data included in the acquired program before change; and an addition correction unit configured to add one of the plurality of pieces of command definition data included in the definition database.

The correction unit is configured to include a deletion correction unit configured to generate a correction program deleted from the program after change for each of one or more pieces of the UI definition data associated with the command definition data deleted from the program before change in the program after change based on the second association information under a condition that the command definition data associated with the UI definition data based on the first association information be not included in the program after change.

In accordance with one or more embodiments of the invention, the UI definition data associated with the command definition data that is not included in the program after change can be deleted.

The control information generating unit is configured to include a prohibition information generating unit configured to generate control information including command definition data identification information used for identifying the command definition data and prohibition information representing that a determination on whether or not the setting value is set based on the UI definition data that is not included in the correction program is not executed in a case where none of the one or more pieces of the UI definition data associated with each of the plurality of pieces of command definition data included in the correction program based on the second association information is included in the correction program.

In accordance with one or more embodiments of the present invention, since the control information includes the prohibition information representing that a determination on whether or not the setting value is set based on the UI definition data that is not included in the correction program is not executed for each of the plurality of command definition data included in the correction program, the determination on whether or not the setting value is set based on the UI definition data that is not included in the correction program can be prevented from being executed based on the plurality of pieces of command definition data. As a result, an unnecessary determination process is not executed by the computer that executes the driver program, and accordingly, a driver program capable of reducing the load can be generated.

The driver program generating apparatus further comprises an alternative generation unit configured to generate alternative command definition data acquired by deleting a description relating to the UI definition data specified by the prohibition information included in the control information that is included in the command definition data specified by the command definition data identification information included in the generated control information.

In accordance with one or more embodiments of the invention, since alternative command definition data is generated which is acquired by deleting a description relating to the UI definition data specified by the prohibition information included in the command definition data, new command definition data can be easily generated.

The function definition database further includes a plurality of pieces of inter-function definition data defining a set of a setting value set for a first related function among two or more related functions selected from among a plurality of functions included in the image processing apparatus and a setting value that cannot be set in a second related function other than the first related function, the program before change is configured to additionally include a plurality of pieces of inter-function definition data corresponding to the plurality of pieces of UI definition data included in the program before change among the plurality of pieces of inter-function definition data, and the driver program generating apparatus further comprises an inter-function data correcting unit configured to correct the plurality of pieces of inter-function definition data included in the program before change based on the plurality of pieces of UI definition data included in the correction program after the correction made by the correction unit.

In accordance with one or more embodiments of the invention, since the plurality of pieces of inter-function definition data included in the program before change are corrected based on the plurality of pieces of UI definition data included in the correction program, the determination on whether or not the setting value can be set based on the UI definition data that is not included in the correction program can be prevented from being executed based on the plurality of inter-function definition data. As a result, an unnecessary determination process is not executed by the computer that executes the driver program, and accordingly, a driver program capable of reducing the load can be generated.

The inter-function data correcting unit includes: a target determining unit configured to determine UI definition data other than the plurality of pieces of UI definition data included in the correction program after the correction made by the correction unit among the plurality of pieces of UI definition data included in the program before change as deleted UI definition data and determine UI definition data other than the plurality of pieces of UI definition data included in the program before change among the plurality of pieces of UI definition data included in the program after change as added UI definition data; and a change unit configured to delete inter-function definition data corresponding to the deleted UI definition data among the plurality of pieces of inter-function definition data included in the program before change and add inter-function definition data corresponding to the added UI definition data by using the plurality of inter-function definition data included in the program before change as a reference.

In accordance with one or more embodiments of the invention, inter-function definition data corresponding to deleted UI definition data is deleted, and inter-function definition data corresponding to added UI definition data is added by using the plurality of inter-function definition data included in the program before change as a reference.

In accordance with one or more embodiments of the invention, a driver program generating method executed by a driver program generating apparatus, the driver program generating method, reflecting one aspect of the invention, causes the driver program generating apparatus to execute: accessing a definition database including a plurality of pieces of UI definition data and a plurality of pieces of command definition data, first association information associating each of the plurality of pieces of UI definition data with one of the plurality of pieces of command definition data, and second association information associating each of the plurality of pieces of command definition data with one or more of the plurality of pieces of UI definition data; each of the plurality of pieces of UI definition data corresponding to one of a plurality of functions and defining one or more setting values settable for the function and a display command used for receiving the one or more setting values, each of the plurality of pieces of command definition data corresponding to one of a plurality of functions, corresponding to one or more setting values settable for the function, and defining one or more print commands common to a plurality of kinds of image forming apparatuses, acquiring a driver program including at least a part of the plurality of pieces of UI definition data and at least a part of the plurality of pieces of command definition data as a program before change; generating a program after change acquired by changing a plurality of pieces of UI definition data and a plurality of pieces of command definition data included in the acquired program before change according to a user's direction; and changing a part of a plurality of pieces of command definition data included in the program after change so as to match a combination of a plurality of pieces of UI definition data and the plurality of pieces of command definition data included in the program after change with association determined based on the first association information and the second association information.

In accordance with one or more embodiments of the invention, a driver program generating method capable of easily generating a new driver program can be provided.

In accordance with one or more embodiments of the invention, a non-transitory recording medium storing a computer readable program which is a driver program generating program, the driver program generating program causes a computer controlling the driver program generating apparatus to execute the driver program generating method.

In accordance with one or more embodiments of the invention, a driver program generating program capable of easily generating a new driver program can be provided.

In accordance with one or more embodiments of the invention, a non-transitory recording medium storing a computer readable program which is a driver program generated using the driver program generating method, the driver program causes a computer controlling a control apparatus that controls the image processing apparatus to execute: selecting one of the one or more pieces of UI definition data; displaying an individual function screen in response to a display command included in the selected UI definition data; accepting a setting value input by a user according to the displayed individual function screen among setting values included in the UI definition data as a setting value set for a function corresponding to the UI definition data; and generating a print command used for implementing a function in the image processing apparatus by sequentially selecting the command definition data and selecting a print command corresponding to one or more accepted setting values based on one or more pieces of the UI definition data corresponding to the function corresponding to the command definition data among one or more print commands corresponding to the selected command definition data.

In accordance with one or more embodiments of the invention, a setting value is accepted based on the UI definition data, and a print command is generated based on the command definition data. Accordingly, by changing the UI definition data and the command definition data, a setting value that can be accepted is changed, and a print command to be generated can be changed. As a result, a driver program capable of easily responding to a change in the function of an image processing apparatus that is the control target can be provided.

BRIEF DESCRIPTION OF THE DRAWINGS

Embodiments of the invention will be more fully understood from the detailed description given herein below and the appended drawings which are given by way of illustration only, and thus are not intended as a definition of the limits of the present invention, and wherein:

FIG. 9 is a diagram that illustrates an example of inter-function definition data in accordance with one or more embodiments of the invention;

FIG. 11 is a diagram that illustrates an example of first association information in accordance with one or more embodiments of the invention;

FIG. 12 is a diagram that illustrates an example of second association information in accordance with one or more embodiments of the invention;

DETAILED DESCRIPTION

Figure 1:
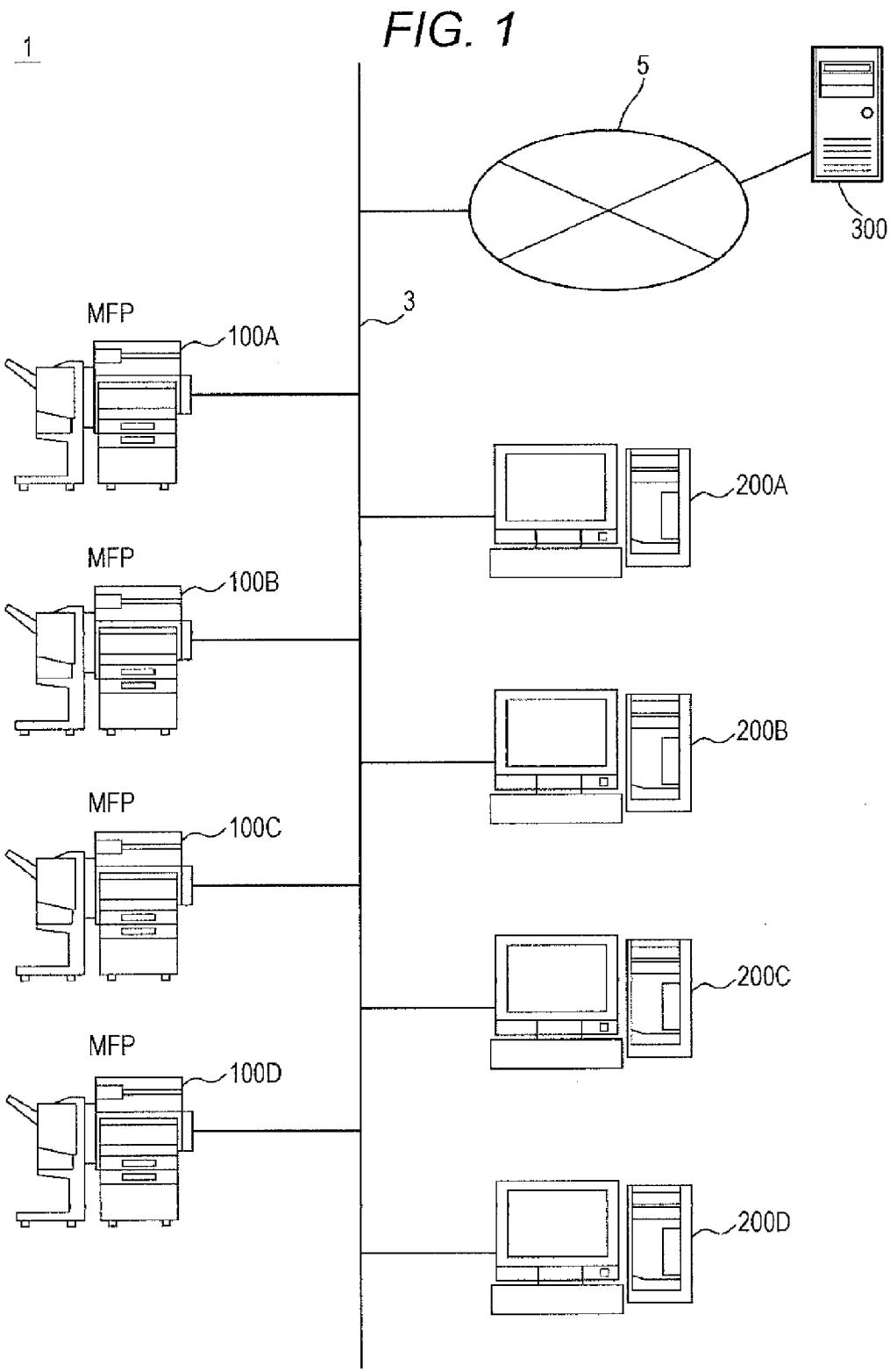
FIG. 1 is a diagram that illustrates an overview of a print system in accordance with one or more embodiments of the invention.

Hereinafter, embodiments of the invention will be described with reference to the drawings. However, the scope of the invention is not limited to the illustrated examples. In the description presented below, the same reference numeral is assigned to the same components. In addition, the names and the functions thereof are the same. Thus, detailed description thereof will not be repeated.

FIG. 1 is a diagram that illustrates an overview of a print system in accordance with one or more embodiments of the invention. As illustrated in FIG. 1, the print system 1 includes: multi-function peripherals (hereinafter, referred to as "MFP"s) 100A, 100B, 100C, and 100D serving as image processing apparatuses; personal computers (hereinafter, referred to as "PC"s) 200A, 200B, 200C, and 200D; and a server 300. The MFPs 100A, 100B, 100C, and 100D and PCs 200A, 200B, 200C, and 200D are connected to a network 3. In the figure, while an example is illustrated in which four MFPs 100A, 100B, 100C, and 100D and four PCs 200A, 200B, 200C, and 200D are connected to the network 3, the number of the MFPs 100A, 100B, 100C, and 100D and the number of the PCs 200A, 200B, 200C, and 200D are not limited thereto, and each of the numbers may be one or more. In addition, instead of the MFPs 100A, 100B, 100C, and 100D, other image processing apparatuses that can be controlled by the PCs 200A, 200B, 200C, 200D may be used. As examples of the image processing apparatuses that can be controlled by the PCs 200A, 200B, 200C, and 200D, there are an image forming apparatus such as a scanner apparatus, a facsimile apparatus, or a printer, a display apparatus such as a projection TV or a projection apparatus, and a storage apparatus that stores data.

The network 3 is a local area network (LAN), and the connection form thereof may be wired or wireless. In addition, the network 3 is not limited to the LAN but may be a wide area network (WAN), a public switched telephone network (PSTN), the Internet, or the like.

The network 3 is connected to the Internet 5. The server 300 is connected to the Internet 5. Each of the MFPs 100A to 100D and the PCs 200A to 200D can communicate with the server 300 through the network 3 and the Internet 5.

Here, an example will be described in which the MFPs 100A to 100D have mutually-different functions. For example, while the MFP 100A has all the functions included in the MFPs 100B to 100D, each of the MFPs 100B to 100D does not have some of a plurality of functions included in the MFP 100A. For example, the MFP 100B does not include an automatic document feeder included in the MFP 100A. In addition, the MFP 100C does not include a color printing function included in the MFP 100A. The MFP 100D does not have a post process function included in the MFP 100A. For this reason, four driver programs used for controlling the MFPs 100A to 100D are different from each other.

The PCs 200A, 200B, 200C, and 200D are general computers. In each of the PCs 200A, 200B, 200C, and 200D, a plurality of driver programs corresponding to the MFPs 100A, 100B, 100C, and 100D are installed, and, by executing the driver programs, the MFPs 100A, 100B, 100C, and 100D are controlled, whereby an image forming process, a document reading process, and the like can be executed by the MFP 100A.

In the print system 1 in accordance with one or more embodiments of the invention, driver programs used for controlling the MFPs 100A to 100D are stored in the server 300. In addition, a driver program generating program is installed to the server 300, and the server 300 serves as a driver program generating apparatus. The driver program generating apparatus generates a new driver program by changing a part of one of the driver programs used for controlling the MFPs 100A to 100D as the reference. Accordingly, a new driver program used for controlling an MFP having a function different from those of the MFPs 100A to 100D can be generated. In addition, a new driver program can be generated by changing a user interface portion of one of the driver programs used for controlling the MFPs 100A to 100D. For example, a display screen of the driver program used for controlling the MFP 100A may be changed to a display screen displayed by the driver program used for controlling the MFP 100B. Hereinafter, regarding details of the print system 1, first, the driver programs used for controlling the MFPs 100A to 100D will be described, and then, the server 300 serving as the driver program generating apparatus will be described.

While the functions of the MFPs 100A to 100D are different from each other, here, the hardware configuration and the functions of the MFP 100A that has all the functions included in the MFPs 100B to 100D will be described.

Figure 2:
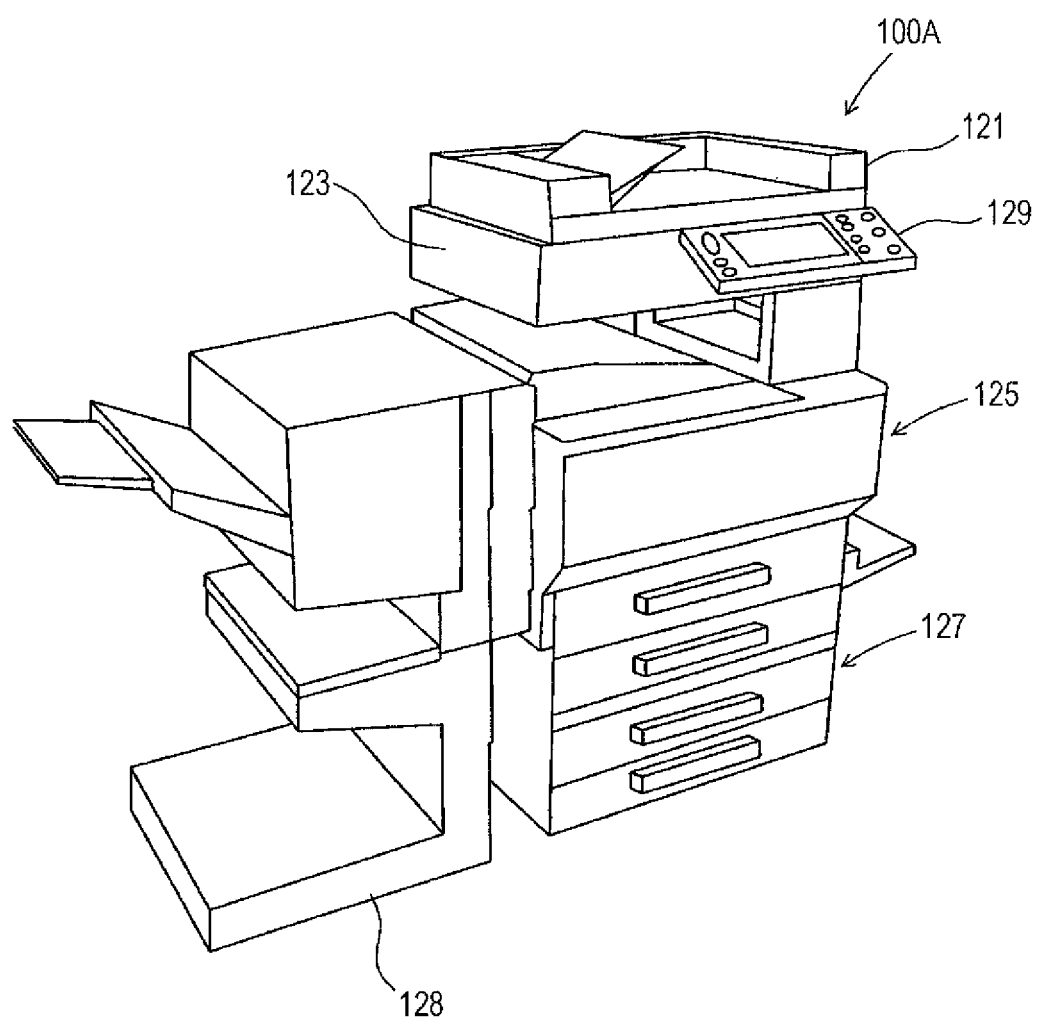
FIG. 2 is a perspective view that illustrates the external appearance of an MFP in accordance with one or more embodiments of the invention.
Figure 3:
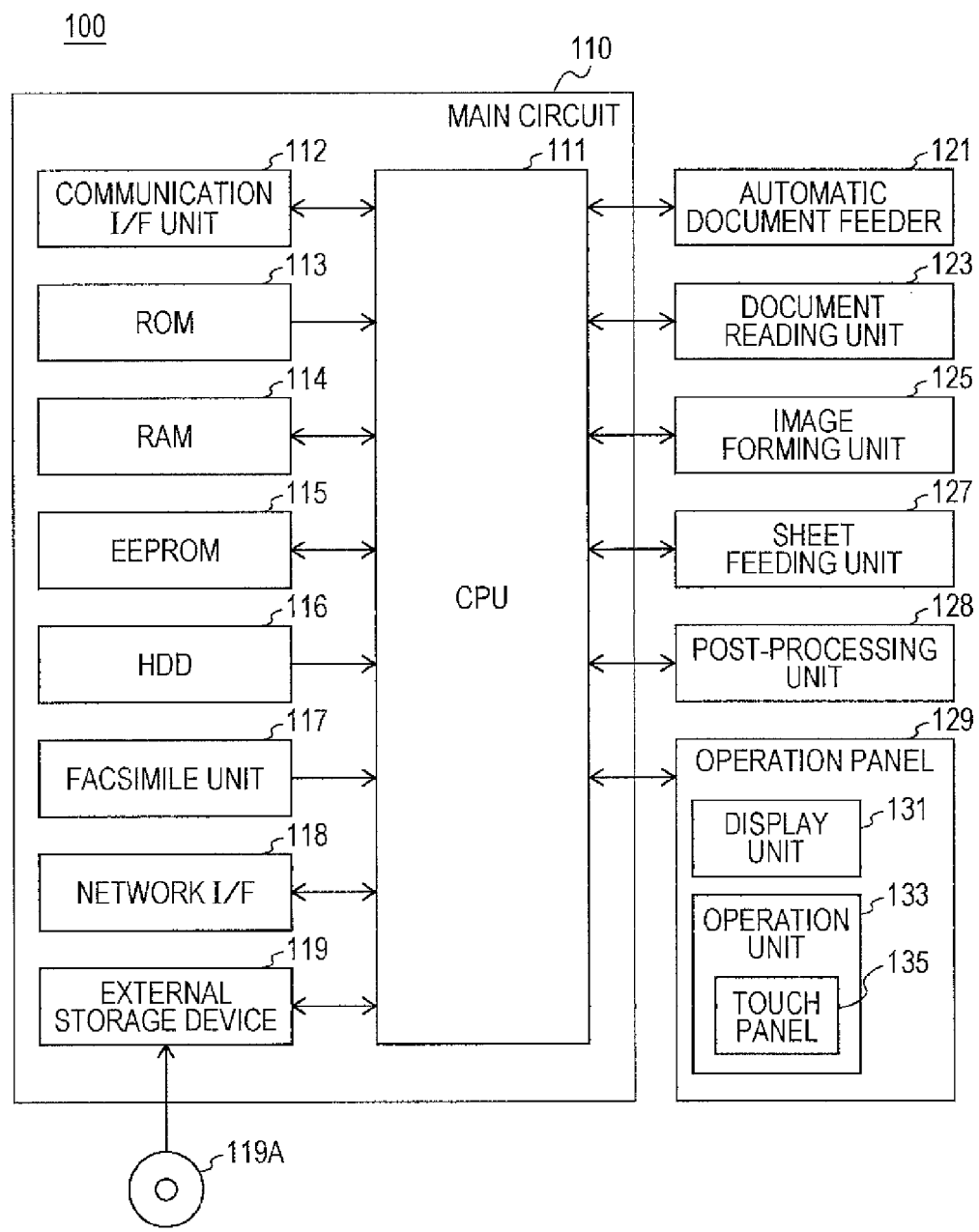
FIG. 3 is a block diagram that illustrates an example of the hardware configuration of the MFP in accordance with one or more embodiments of the invention.

FIG. 2 is a perspective view that illustrates the external appearance of an MFP in accordance with one or more embodiments of the invention. FIG. 3 is a block diagram that illustrates an example of the hardware configuration of the MFP in accordance with one or more embodiments of the invention. As illustrated in FIGS. 2 and 3, the MFP 100A includes: an automatic document feeder (hereinafter, referred to as an "ADF") 121; a document reading unit 123; an image forming unit 125 that forms an image on a sheet or the like based on image data that is acquired by reading a document and output by the document reading unit 123; a sheet feeding unit 127 that supplies the sheet to the image forming unit 125; a post-processing unit 128 that processes the sheet on which an image is formed; an operation panel 129 as a user interface; and a main circuit 110.

The ADF 121 automatically conveys a plurality of sheets of documents set on a document feed tray one by one at a time up to a predetermined document reading position that is set on a platen glass of the document reading unit 123 and discharges each document of which the document image has been read by the document reading unit 123 to a document discharge tray. The document reading unit 123 includes: a light source emitting light onto a document that is conveyed to the document reading position; and a photoelectric conversion device that receives light reflected from the document and scans a document image according to the size of the document. The photoelectric conversion device converts the received light into image data that is an electric signal and outputs the image data to the image forming unit 125. The sheet feeding unit 127 conveys a sheet housed in a sheet feed tray to the image forming unit 125.

The image forming unit 125 forms an image using a known electrographic system. The image forming unit 125 performs various kinds of data processing such as a shading correction for image data received from the outside or image data input from the document reading unit 123 and forms an image on a sheet conveyed by the sheet feeding unit 127 based on the image data after the data processing.

The post-processing unit 128 discharges a sheet on which an image is formed. The post-processing unit 128 includes a plurality of sheet discharging tray and can discharge sheets on which images are formed in a sorted manner. In addition, the post-processing unit 128 includes a punched hole processing unit and a staple processing unit and can perform punched hole processing or staple processing for a discharged sheet. Furthermore, the MFP 100A includes an operation panel 129 as a user interface for a user on the upper face thereof.

The main circuit 110 includes: a CPU 111; a communication interface (I/F) unit 112; a read only memory (ROM) 113; a random access memory (RAM) 114; an electrically erasable and programmable ROM (EEPROM) 115; a hard disk drive (HDD) 116 as a mass storage device; a facsimile unit 117; a network I/F 118; and an external storage device 119 in which a compact disk (CD)-ROM 119A is mounted. The CPU 111 is connected to the automatic document feeder 121, the document reading unit 123, the image forming unit 125, the sheet feeding unit 127, the post-processing unit 128; and the operation panel 129 and controls the overall operation of the MFP 100A.

The ROM 113 stores programs executed by the CPU 111 and data required for the execution of the programs. The RAM 114 is used as a work area when the CPU 111 executes a program. In addition, the RAM 114 temporarily stores read data (image data) that is continuously transmitted from the document reading unit 123.

The operation panel 129 is disposed on the upper face of the MFP 100A. The operation panel 129 includes a display unit 131 and an operation unit 133. The display unit 131 is a display such as an LCD or an organic electro-luminance display (ELD) and displays an instruction menu for the user, information relating to acquired image data, and the like. The operation unit 133 includes a plurality of keys and receives various instructions, input of data such as a text, a number, and the like according to a user's operation corresponding to a key. The operation unit 133 further includes a touch panel 135 that detects a position on the display face of the display unit 131. The touch panel 135 is disposed on the upper face or the lower face of the display unit 131 and outputs coordinates of a position directed by the user to the CPU 111.

The communication I/F unit 112 is an interface that is used for connecting the MFP 100A to an external device. The network I/F 118 is an interface that is used for connecting the MFP 100A to the network 3. The CPU 111 communicates with the PCs 200A, 200B, 200C, and 200D connected to the network 3 through the network I/F 118, thereby performing data transmission and data reception. In addition, the network I/F 118 can communicate with a computer such as the server 300 connected to the Internet through the network 3.

The facsimile unit 117 is connected to the PSTN and transmits/receives facsimile data. The facsimile unit 117 converts image data read by the document reading unit 123 or data stored in the HDD 116 into facsimile data and transmits the converted facsimile data to the facsimile apparatus connected to the PSTN. In addition, the facsimile unit 117 stores the received facsimile data in the HDD 116 or causes the image forming unit 125 to form an image of the facsimile data on a sheet.

In the external storage device 119, a CD-ROM 119A is mounted. The CPU 111 can access the CD-ROM 119A through the external storage device 119. The CPU 111 loads a program recorded in the CD-ROM 119A mounted in the external storage device 119 into the RAM 114 and executes the loaded program. Here, the program executed by the CPU 111 is not limited to a program recorded in the CD-ROM 119A but may be configured to load a program stored in the HDD 116 into the RAM 114 and execute the loaded program. In such a case, another computer connected to the network 3 may be configured to rewrite a program stored in the HDD 116 of the MFP 100A or write the program with a new program being added thereto. In addition, the MFP 100A may be configured to download a program from another computer connected to the network and store the program in the HDD 116. The program described here includes not only a program that can be directly executed by the CPU 111 but also a source program, a compressed program, an encrypted program, and the like.

The hardware configurations and the functions of the PCs 200A, 200B, 200C, and 200D are the same, and thus, the hardware configuration and the function of the PC 200A will be described as an example.

Figure 4:
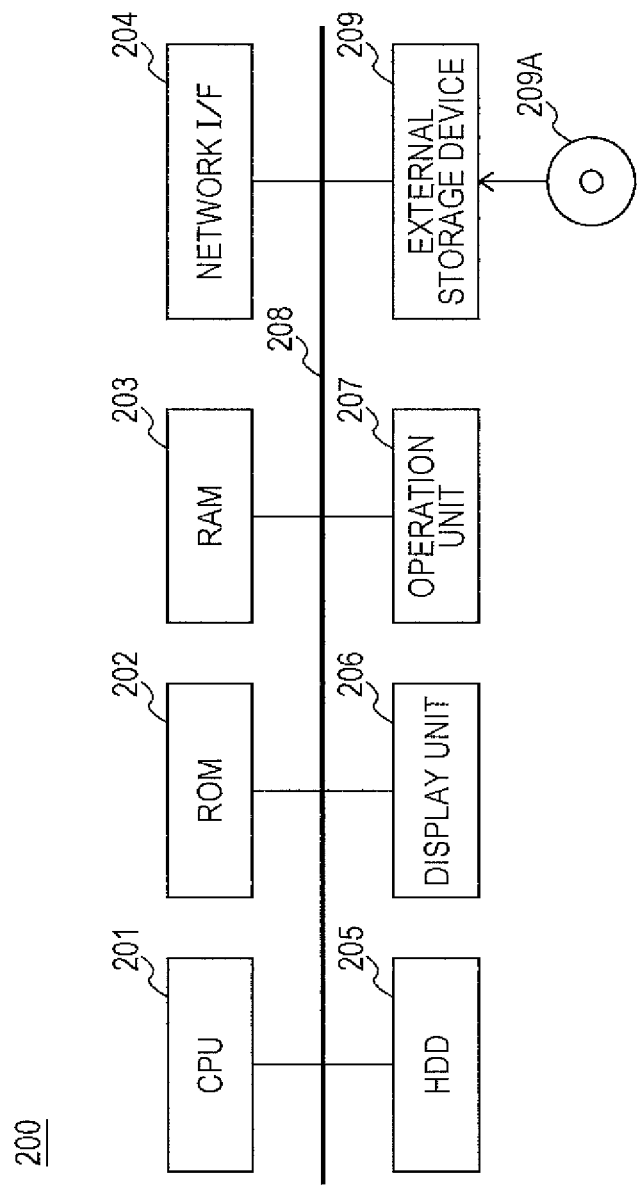
FIG. 4 is a block diagram that illustrates an example of the hardware configuration of a PC in accordance with one or more embodiments of the invention.

FIG. 4 is a block diagram that illustrates an example of the hardware configuration of the PC in accordance with one or more embodiments of the invention. As illustrated in FIG. 4, the PC 200A includes a CPU 201, a ROM 202, a RAM 203, a network I/F 204, an HDD 205, a display unit 206, an operation unit 207, and an external storage device 209 that are connected to a bus 208.

The CPU 201 controls the overall operation of the PC 200A. The ROM 202 stores programs executed by the CPU 201 and the like. The RAM 203 is used as a work area of the CPU 201. The network I/F 204 is an interface used for connecting the PC 200A to the network 3. The HDD 205 is a mass storage device and stores data in a nonvolatile manner. The display unit 206 is a display apparatus such as a liquid crystal display apparatus, a cathode ray tube (CRT) or an organic electro-luminescence display (ELD). The operation unit 207 is a pointing device such as a keyboard, a mouse, or a touch panel and receives an input of a user operation.

In the external storage device 209, a CD-ROM 209A is mounted. The CPU 201 loads a program stored in the CD-ROM 209A into the RAM 203 through the external storage device 209 and executes the loaded program. Here, a recording medium storing the program is not limited to the CD-ROM 209A but may be a flexible disk, a cassette tape, an optical disc (MO/MD/DVD), a semiconductor memory such as an IC card, an optical card, a mask ROM, an EPROM, or an EEPROM, or the like. In addition, a program stored in the HDD 205 may be configured to be loaded into the RAM 203 and be executed. In such a case, the PC 200A may be configured to download a program from another computer connected to the network 3 and store the program in the HDD 205. The program described here includes not only a program that can be directly executed by the CPU 201 but also a source program, a compressed program, an encrypted program, and the like.

Figure 5:
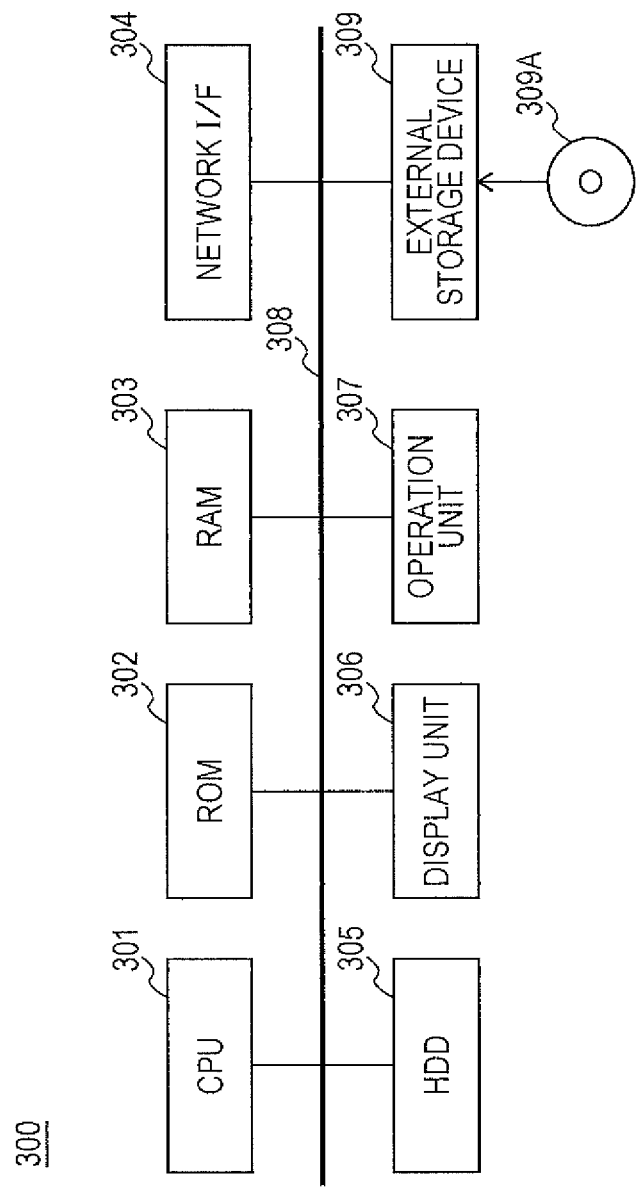
FIG. 5 is a block diagram that illustrates an example of the hardware configuration of a server in accordance with one or more embodiments of the invention.

FIG. 5 is a block diagram that illustrates an example of the hardware configuration of the server in accordance with one or more embodiments of the invention. As illustrated in FIG. 5, the server 300 includes: a CPU 301; a ROM 302; a RAM 303; a network I/F 304; an HDD 305; a display unit 306; an operation unit 307; and an external storage device 309 that are connected to a bus 308.

The CPU 301 controls the overall operation of the server 300. The ROM 302 stores programs executed by the CPU 301 and the like. The RAM 303 is used as a work area of the CPU 301. The network I/F 304 is an interface used for connecting the server 300 to the network 3. The HDD 305 is a mass storage device and stores data in a nonvolatile manner. The display unit 306 is a display apparatus such as a liquid crystal display apparatus, a cathode ray tube (CRT) or an organic ELD. The operation unit 307 is a pointing device such as a keyboard, a mouse, or a touch panel and receives an input of a user operation.

In the external storage device 309, a CD-ROM 309A is mounted. The CPU 301 loads a program stored in the CD-ROM 309A into the RAM 303 through the external storage device 309 and executes the loaded program. Here, a recording medium storing the program is not limited to the CD-ROM 309A but may be a flexible disk, a cassette tape, an optical disc (MO/MD/DVD), a semiconductor memory such as an IC card, an optical card, a mask ROM, an EPROM, or an EEPROM, or the like. In addition, a program stored in the HDD 305 may be configured to be loaded into the RAM 303 and be executed. In such a case, the server 300 may be configured to download a program from another computer connected to the network 3 and store the program in the HDD 305. The program described here includes not only a program that can be directly executed by the CPU 301 but also a source program, a compressed program, an encrypted program, and the like.

Next, a driver program used for controlling the MFPs 100A to 100D will be described, Here, a case will be described as an example in which the PC 200A executes the driver program for controlling the MFP 100A.

Figure 6:
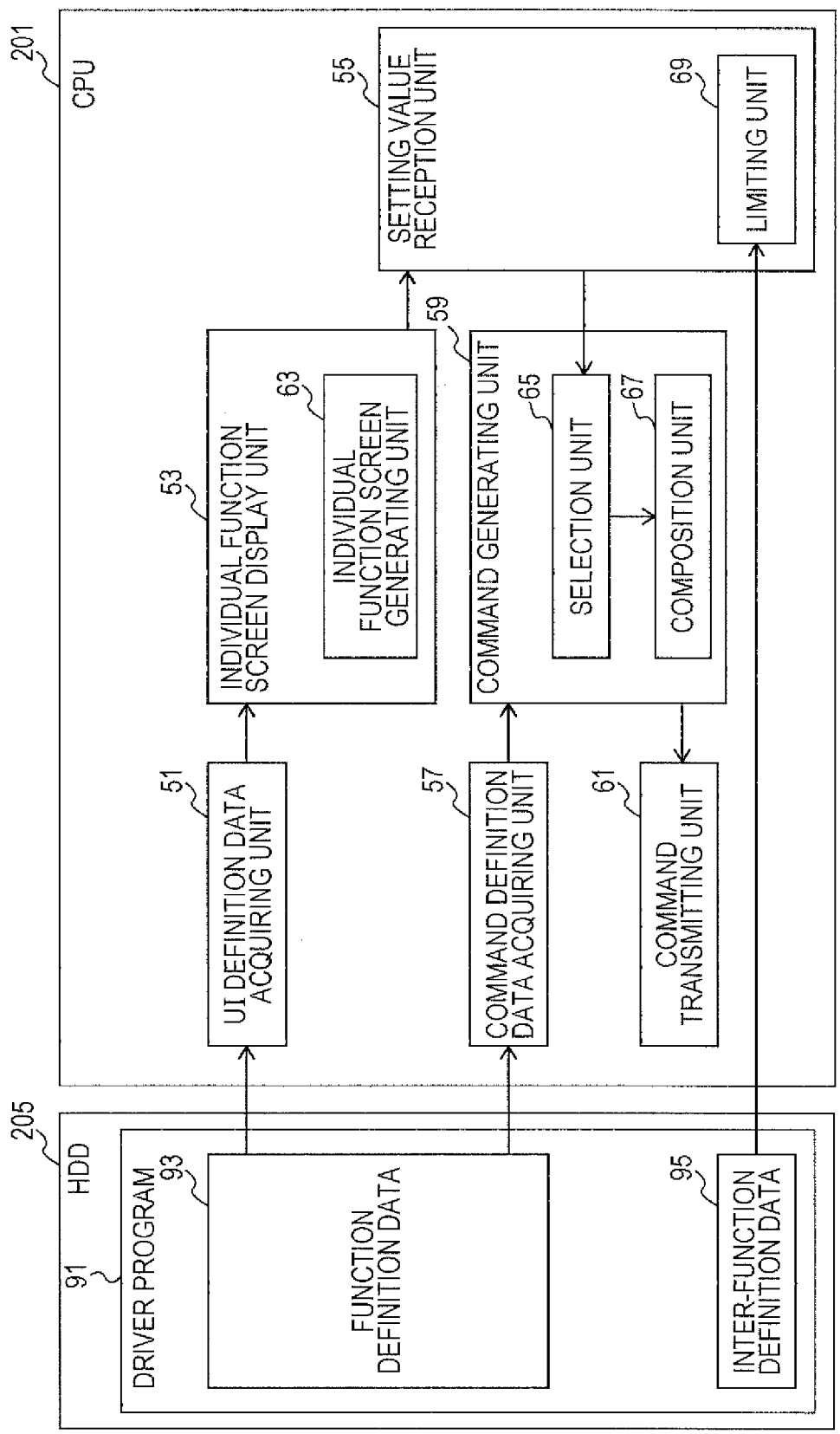
FIG. 6 is a block diagram that illustrates an example of the function of a CPU included in a PC executing a driver program together with data stored in an HDD in accordance with one or more embodiments of the invention.

FIG. 6 is a block diagram that illustrates an example of the function of a CPU included in a PC executing a driver program together with data stored in an HDD in accordance with one or more embodiments of the invention. The function illustrated in FIG. 6 is a function implemented in the CPU 201 as the CPU 201 included in the PC 200A executes the driver program used for controlling the MFP 100A that is stored in the HDD 205.

As illustrated in FIG. 6, the PC 200A stores the driver program 91 used for controlling the MFP 100A in the HDD 205. The driver program 91 includes function definition data 93 and inter-function definition data 95. The function definition data 93 and the inter-function definition data 95 are described using a markup language such as an extensible markup language or a programming language such as a C language. Accordingly, the function definition data 93 and the inter-function definition data 95 can be easily changed by using an editing program or the like. In addition, the function definition data 93 and the inter-function definition data 95 may be data acquired by binarizing a script language or data binarized by compiling a programming language. Here, while the function definition data 93 and the inter-function definition data 95 are configured as apart of the driver program, the function definition data 93 and the inter-function definition data 95 may be stored in the HDD 205 as data other than the driver program.

The function definition data 93 includes a plurality of pieces of UI definition data and a plurality of pieces of command definition data. Each of the plurality of pieces of UI definition data corresponds to one of a plurality of functions and defines one or more setting values that can be set for the corresponding function and a display command used for receiving the one or more setting values. The display command is a command that is used for causing the CPU 201 to display an individual function screen. The display command includes position information that represents a position within an image displayed on the display unit 206 by the CPU 201 and component specifying information that specifies a component to be displayed. The component displayed on the display unit 206 by the CPU 201 is an image that is prepared in advance and, for example, is a popup window, a combo box, a list box, a radio button, or the like.

Each of the plurality of pieces of command definition data corresponds to one of the plurality of functions and defines one or more print commands that correspond to one or more setting values, which can be set for the function, and are common to the MFPs 100A to 100D. The print commands are commands that can be analyzed by the MFPs 100A to 100D and are commands that are defined in advance among the MFPs 100A to 100D. The print commands are defined by using a print job language (PJL), a printer control language (PCL), an XML paper specification (XPS) PrintTicket, or a postscript (PS).

The inter-function definition data 95 defines a set of a setting value set for a first related function among two or more related functions selected from the plurality of functions included in the MFP 100A, a setting value that cannot be set in a second related function other than the first related function among the two or more related functions, and a setting value that can be set in the second related function. In other words, in a case a first setting value is set for the first related function among one or more setting values that can be set for the second related function, the inter-function definition data 95 defines a second setting value that cannot be set and a third setting value that can be set. There are cases where the inter-function definition data includes a message display command. The message display command includes a prohibition message that is used for notifying a user that the second setting value is set for the second related function.

The CPU 201 included in the PC 200A includes: a UI definition data acquiring unit 51; an individual function screen display unit 53; a setting value reception unit 55; a command definition data acquiring unit 57; a command generating unit 59; and a command transmitting unit 61.

The UI definition data acquiring unit 51 reads a plurality of pieces of UI definition data from among the function definition data 93 stored in the HDD 205 and outputs display commands included in the plurality of pieces of UI definition data to the individual function screen display unit 53.

A display command is input for each of the plurality of functions to the individual function screen display unit 53 from the UI definition data acquiring unit 51. The individual function screen display unit 53 displays a function selection screen from which a plurality of functions can be selected. The function selection screen is a screen on which tabs including images of names of the plurality of functions are arranged. The individual function screen display unit 53 displays the generated function selection screen on the display unit 206 so as to be arranged at a position defined in area information. Accordingly, the individual function screen is determined for each of the plurality of functions.

The individual function screen display unit 53 includes an individual function screen generating unit 63. When a user inputs an operation directing one of the plurality of tabs included in the function selecting screen to the operation unit 207, the individual function screen generating unit 63 specifies a function corresponding to the directed tab among the plurality of functions. The individual function screen generating unit 63 generates an individual function screen that corresponds to the specified function. More specifically, the individual function screen generating unit 63 specifies a display command corresponding to the specified function among display commands for the plurality of functions input from the UI definition data acquiring unit 51 and generates an individual function screen according to the specified display command. The individual function screen generating unit 63 arranges components specified in component specifying information included in the display command at positions specified by the position information included in the display command inside a screen displayed by the display unit 206, thereby generating an individual function screen. The individual function screen display unit 53 outputs the individual function screen to the setting value reception unit 55.

The setting value reception unit 55 accepts a setting value input by the user operating the PC 200A to the operation unit 207 according to the individual function screen as a setting value set for the function corresponding to the individual function screen. The setting value reception unit 55 outputs a set of function identification information used for identifying a function corresponding to the individual function screen and the received setting value to the command generating unit 59.

The setting value reception unit 55 includes a limiting unit 69. The limiting unit 69 reads the inter-function definition data 95 from the HDD 205 and limits the setting value that can be set on the individual function screen based on the inter-function definition data 95. The inter-function definition data 95 defines a set of a first setting value set for the first related function, a second setting value that can be set for the second related function, and a third setting value that cannot be set for the second related function. In a state in which the individual function screen corresponding to the first related function is displayed by the individual function screen display unit 53, in a case where the first setting value corresponding to the first related function is received, the limiting unit 69 sets a second setting value forming a set with the first setting value according to the inter-function definition data 95 as a setting value corresponding to the second related function. In a case where the inter-function definition data 95 includes a message display command, the limiting unit 69 specifies a prohibition message according to the message display command and displays the specified prohibition message.

In addition, after the first setting value is set as the setting value corresponding to the first related function, in a case where an individual function screen corresponding to the second related function is displayed by the individual function screen display unit 53, the limiting unit 69 limits a setting value that can be accepted as a setting value corresponding to the second related function to the second setting value forming a set with the first setting value according to the inter-function definition data 95.

Furthermore, after the third setting value is set as the setting value corresponding to the second related function, in a case where the first setting value is set as a setting value corresponding to the first related function by the individual function screen display unit 53, the limiting unit 69 automatically changes the third setting value set as a setting value corresponding to the second related function to the second setting value. Accordingly, the setting of a set of the first setting value set for the first related function and the third setting value that cannot be set for the second related function is prevented, and, by automatically setting the second setting value that can be set for the second related function, a user's operation can be supported.

For example, an example of a case where the first related function is a double-side printing process and the second related function is a staple processing process will be illustrated. For the double-side printing process, there are a setting value "ON" representing that images are formed on both sides and a setting value "OFF" representing that an image is formed on one side, and, for a staple processing process, there are a setting value "One left point" representing that one staple needle is driven into the left end of sheets, a setting value "Two left points" representing that two staple needles are driven into the left end of sheets, a setting value "Two upper points" representing that two staple needles are driven into the upper end of sheets, and a setting value "Off" representing that no staple needle is driven. In this case, there are cases where the inter-function definition data 95 defines a set of the setting value "ON" as a first setting value of the double side printing process that is the first related function and "Off" as a second setting value of the staple processing process that is the second related function. This means that the staple processing is prohibited in a case where the double-side printing is set. In a case where the setting value "ON" representing images are formed on both sides for the double printing process is received, the limiting unit 69 sets the setting value "Off" representing that no staple needle is driven is set as the setting value of the staple processing process that is the second related function. In addition, in a case where the inter-function definition data 95 includes a message display command displaying a prohibition message of "No stapling is set", the prohibition message is displayed. Since the message of "No stapling is set" is displayed by the common screen display unit 53, the user can be notified that the setting value "Off" representing that no staple is driven is set as the setting value for the staple processing process.

In addition, for the double side printing process that is the first related function, after the setting value "ON" representing that images are formed on both sides is received, in a case where an individual function screen corresponding to the staple processing process is displayed by the individual function screen display unit 53, the limiting unit 69 limits the setting value that can be accepted as a setting value corresponding to the staple processing process to the setting value "Off" representing that no staple needle is driven by referring to the inter-function definition data 95. Accordingly, it can be prevented that a setting value that cannot be executed by the MFP 100A is set by the user for the staple processing process that is the second related function.

The command definition data acquiring unit 57 reads a plurality of pieces of command definition data included in the function definition data 93 stored in the HDD 205 and outputs the plurality of pieces of command definition data to the command generating unit 59.

The command generating unit 59 sequentially selects the plurality of pieces of command definition data input from the command definition data acquiring unit 57 and specifies a set that includes the function identification information of the function of the command definition data selected from among a plurality of sets of the function identification information and the setting value input from the setting value reception unit 55. Next, the command generating unit 59 sequentially selects one or more print commands included in the selected command definition data and determines whether or not the print command corresponds to the setting value forming a set with the function identification information of the function of the command definition data. The command generating unit 59 selects a print command corresponding to the setting value included in the specified set from among the one or more print commands included in the selected command definition data. The command generating unit 59 outputs the selected print command to the command transmitting unit 61. The command generating unit 59, for each of the plurality of pieces of command definition data input from the command definition data acquiring unit 57, selects print commands corresponding to the setting value received for the same function by the setting value reception unit 55 and outputs all the selected print commands to the command transmitting unit 61.

The command transmitting unit 61 transmits one or more print commands input from the selection unit 65 to the MFP 100A through the network I/F 204 together with the print data.

Also in a case where a new function is added to the MFP 100A, UI definition data defining command definition data that defines a new print command corresponding to the added function and one or more setting values that can be set for the function may be added. Accordingly, the driver program does not need to be changed. In addition, since the function definition data 93 is described in a markup language such as the XML or a programming language such as the C language, the UI definition data and the command definition data can be easily changed. Particularly, only the function definition data 93 and the inter-function definition data may be rewritten without installing the driver program.

Figure 7:
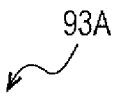
FIG. 7 is a first diagram that illustrates an example of command definition data in accordance with one or more embodiments of the invention.

FIG. 7 is a first diagram that illustrates an example of the command definition data in accordance with one or more embodiments of the invention. As illustrated in FIG. 7, command definition data 93A corresponds to a stapling function, and, print commands common to MFPs 100A to 100D are associated with a plurality of setting values each set in one piece of UI definition data 1 and UI definition data 5. More specifically, a print command "Staple=OFF" is associated with a setting value "1" set in the UI definition data 1. A print command "Staple=LEFT1" is associated with a setting value "2" set in the UI definition data 1. In addition, a print command "Staple=LEFT2" is associated with a setting value "3" set in the UI definition data 1. A print command "Staple=RIGHT1" is associated with a setting value "4" set in the UI definition data 1. In addition, a print command "Staple=RIGHT2" is associated with a setting value "5" set in the UI definition data 1. A print command "Staple=ON" is associated with a setting value "1" set in the UI definition data 5. In addition, a print command "Staple=ON" is associated with a setting value "2" set in the UI definition data 5.

Figure 8:
FIG. 8 is a second diagram that illustrates an example of command definition data in accordance with one or more embodiments of the invention.

FIG. 8 is a second diagram that illustrates an example of command definition data in accordance with one or more embodiments of the invention. As illustrated in FIG. 8, command definition data 93B corresponds to a punching function, and, print commands common to MFPs 100A to 100D are associated with a plurality of setting values set in the UI definition data 3. More specifically, a print command "Punch=OFF" is associated with a setting value "1" set in the UI definition data 3. A print command "Punch=LEFT" is associated with a setting value "2" set in the UI definition data 3. In addition, a print command "Punch=RIGHT" is associated with a setting value "3" set in the UI definition data 3. A print command "punch=TOP" is associated with a setting value "4" set in the UI definition data 3.

FIG. 9 is a diagram that illustrates an example of the inter-function definition data in accordance with one or more embodiments of the invention. As illustrated in FIG. 9, the inter-function definition data 95A, for a setting value "1" set in UI definition data 1, defines a setting value "2" that cannot be set in the UI definition data 11 and a setting value "0" that can be set therein. In addition, for a setting value "1" set in UI definition data 2, a setting value "2" that cannot be set in the UI definition data 12 and a setting value "0" that can be set therein are defined. Furthermore, for a setting value "1" set in UI definition data 3, a setting value "2" that cannot be set in the UI definition data 13 and a setting value "0" that can be set therein are defined. In addition, for a setting value "1" set in UI definition data 4, a setting value "2" that cannot be set in the UI definition data 14 and a setting value "0" that can be set therein are defined.

Figure 10:
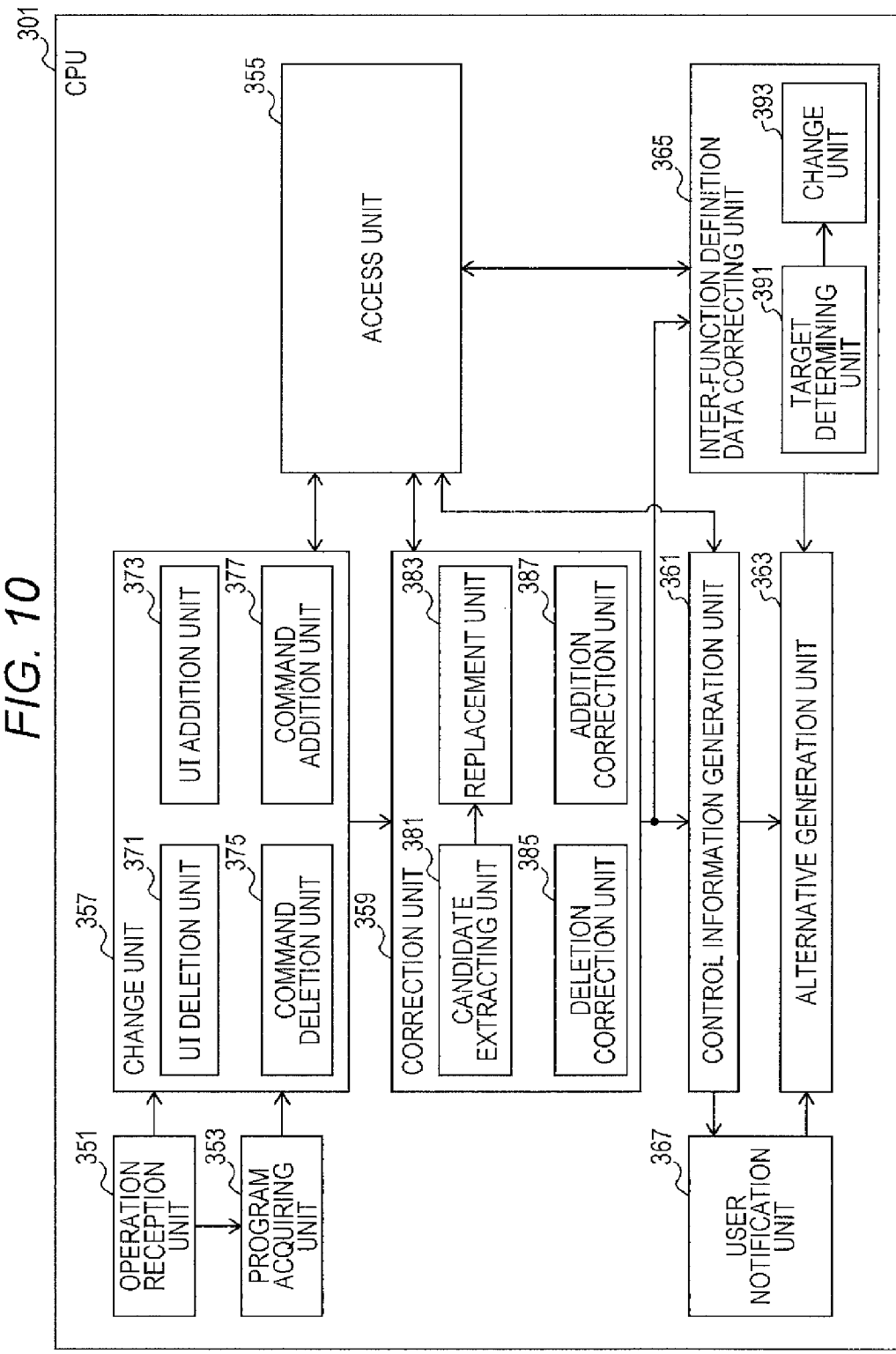
FIG. 10 is a block diagram that illustrates an example of the function of a CPU included in a server in accordance with one or more embodiments of the invention.

FIG. 10 is a block diagram that illustrates an example of the function of the CPU included in the server in accordance with one or more embodiments of the invention. The function illustrated in FIG. 10 is a function implemented in the CPU 301 as the CPU 301 included in the server 300 executes the driver program generating program stored in the ROM 302, the HDD 305, or the CD-ROM 309A. In addition, the server 300 stores all the definition database and the driver programs for controlling the MFPs 100A to 100D in the HUD 305.

The definition database includes: a plurality of pieces of UI definition data and a plurality of pieces of command definition data; first association information associating each of the plurality of pieces of UI definition data with one of the plurality of pieces of command definition data; second association information associating each of the plurality of pieces of command definition data with one or more of the plurality of pieces of UI definition data; and a plurality of pieces of inter-function definition data. The plurality of pieces of UI definition data included in the definition database includes a plurality of pieces of UI definition data that is included in the driver programs used for controlling at least the MFPs 100A to 100D. The plurality of pieces of command definition data included in the definition database includes the plurality of pieces of UI definition data included in the driver programs used for controlling at least the MFPs 100A to 100D. The inter-function definition data includes a plurality of pieces of inter-function definition data included in the driver programs used for controlling at least the MFPs 100A to 100D.

FIG. 11 is a diagram that illustrates an example of the first association information in accordance with one or more embodiments of the invention. As illustrated in FIG. 11, the command definition data 1 is associated with the UI definition data 1. The first association information associates one piece of command definition data with one piece of UI definition data.

FIG. 12 is a diagram that illustrates an example of the second association information in accordance with one or more embodiments of the invention. As illustrated in FIG. 12, the UI definition data 1 and the UI definition data 5 are associated with the command definition data 1. The second association information associates one or more pieces of the UI definition data with one piece of command definition data.

As illustrated in FIG. 10, the CPU 301 included in the server 300 includes: an operation reception unit 351; a program acquiring unit 353; an access unit 355; a change unit 357; a correction unit 359; a control information generation unit 361; an alternative generation unit 363; and an inter-function definition data correcting unit 365.

The operation reception unit 351 receives a user's operation input to the operation unit 307. The operation reception unit 351 outputs the received operation to the program acquiring unit 353 and the change unit 357.

The program acquiring unit 353 acquires one from among the driver programs used for controlling the MFP 100A to 100D, which are stored in the HDD 305, in response to an operation input from the operation reception unit 351. More specifically, the program acquiring unit 353 displays a list of the driver programs used for controlling the MFPs 100A to 100D, which are stored in the HDD 305, on the display unit 306 and, when the user inputs an operation of selecting one driver program from the list to the operation unit 307, reads the driver program selected by the user from the HDD 305. The program acquiring unit 353 outputs the driver program read from the HDD 305 to the change unit 357. At this time point, the driver program selected by the user is a driver program serving as a reference for generating a new driver program. Hereinafter, the driver program that is selected by the user and is acquired by the program acquiring unit 353 will be referred to as a "program before change".

The access unit 355 accesses the definition database stored in the HDD 305. The definition database includes: a plurality of pieces of UI definition data; a plurality of pieces of command definition data, and a plurality of pieces of inter-function data. The access unit 355 acquires arbitrary UI definition data, command definition data, and inter-function definition data from the definition database.

The change unit 357 generates a driver program acquired by changing a plurality of pieces of UI definition data and a plurality of pieces of command definition data included in the program before change, which is input from the program acquiring unit 353, according to a user's direction. Hereinafter, the driver program acquired by changing the program before change using the change unit 357 will be referred to as a "program after change".

The change unit 357 outputs the program after change and information representing a difference between the program after change and the program before change to the correction unit 359. The information representing the difference includes: deleted UI information including UI definition data identification information used for identifying UI definition data that is included in the program before change but is not included in the program after change; added UI information including UI definition data identification information used for identifying UI definition data that is not included in the program before change but is included in the program after change; added command information including command definition data identification information used for identifying command definition data that is included in the program before change but is not included in the program after change; and added command information including command definition data identification information used for identifying command definition data that is not included in the program before change but is included in the program after change.

The change unit 357 includes: a UI deletion unit 371; a UI addition unit 373; a command deletion unit 375; and a command addition unit 377. The UI deletion unit 371 specifies UI definition data that is a deletion target from among a plurality of pieces of UI definition data included in the program before change according to an operation input from the operation reception unit 351 and deletes the specified UI definition data from the program before change. Hereinafter, the UI definition data deleted from the program before change will be referred to as deleted UI definition data.

The UI addition unit 373 specifies UI definition data that is an addition target from among a plurality of pieces of UI definition data included in the definition database according to an operation input from the operation reception unit 351 and adds the specified UI definition data to the program before change. Hereinafter, the UI definition data added to the program before change will be referred to as added UI definition data.

The command deletion unit 375 specifies command definition data that is a deletion target from among a plurality of pieces of command definition data included in the program before change according to an operation input from the operation reception unit 351 and deletes the specified command definition data from the program before change. Hereinafter, the command definition data deleted from the program before change will be referred to as deleted command definition data.

The command addition unit 377 specifies command definition data that is an addition target from among a plurality of pieces of command definition data included in the definition database according to an operation input from the operation reception unit 351 and adds the specified command definition data to the program before change. Hereinafter, the command definition data added to the program before change will be referred to as added command definition data.

The correction unit 359 corrects the program after change input from the change unit 357 and outputs the program after change that has been corrected to the control information generation unit 361 and the inter-function definition data correcting unit 365. Hereinafter, the program after change that is acquired by correcting the program after change using the correction unit 359 will be referred to as a correction program. By referring to the first association information and the second association information included in the definition database, in order to match a combination of a plurality of pieces of UI definition data and a plurality of pieces of command definition data included in the program after change and the association determined based on the first association information and the second association information, the correction unit 359 changes a part of data of the plurality of pieces of command definition data included in the program after change. The correction unit 359 includes: a candidate extracting unit 381; a replacement unit 383; a deletion correcting unit 385; and an addition correction unit 387.

The candidate extracting unit 381 specifies command definition data associated with the deleted UI definition data specified by the deleted UI information based on the first association information as deletion candidate command definition data. In a case where the specified deletion candidate command definition data is associated with one or more pieces of UI definition data other than the deleted UI definition data based on the second association information, the candidate extracting unit 381 extracts the command definition data associated with all the one or more pieces of UI definition data other than the deleted UI definition data based on the second association information as additional candidate command definition data. The candidate extracting unit 381 outputs the deletion candidate command definition data and the additional candidate command definition data to the replacement unit 383.

The replacement unit 383 replaces the deletion candidate command definition data input from the candidate extracting unit 381, which is included in the program after change, with the additional candidate command definition data input from the candidate extracting unit 381. In other words, the deletion candidate command data is deleted from the program after change, and the additional candidate command data is added to the program after change.

The deletion correcting unit 385 deletes one or more pieces of UI definition data associated with the deleted command definition data specified by the deleted command information based on the second association information from the program after change under the condition that the command definition data associated with the UI definition data based on the first association information be not included in the program after change.

In a case where the command definition data associated with the added UI definition data specified by the added UI information based on the first association information is not included in the program after change, the addition correction unit 387 extracts command definition data associated with the added UI definition data based on the first association information from the definition database and adds the extracted command definition data to the program after change.

The control information generation unit 361 receives a correction program from the correction unit 359 as an input, generates control information based on the correction program, and outputs the generated control information to a user notification unit 367 and the alternative generation unit 363. The control information includes command definition data identification information used for identifying the command definition data and prohibition information representing that a determination on whether or not a setting value is set based on the UI definition data not included in the program after the correction is not executed. The control information generation unit 361, in a case where all of one or more pieces of UI definition data associated with each of a plurality of pieces of command definition data included in the correction program based on the second association information are not included in the correction program, generates control information including the command definition data identification information used for identifying the command definition data and the prohibition information representing that a determination on whether or not a setting value is set based on the UI definition data not included in the correction program is not executed.

The user notification unit 367 gives a notification representing that the command definition data needs to be corrected according to the input of the control information from the control information generation unit 361. For example, the user notification unit 367 displays a message screen including the command definition data identification information included in the control information and a description relating to the UI definition data specified by the prohibition information included in the control information that is included in the command definition data specified by the command definition data identification information on the display unit 306. After the message screen is displayed, in a case where an operation directing the generation of an alternative command, which is input to the operation unit 307 by the user, is received, the user notification unit 367 outputs an alternative direction to the alternative generation unit 363.

The inter-function definition data correcting unit 365 sets a correction program input from the correction unit 359 as its processing target. The inter-function definition data correcting unit 365 corrects a plurality of pieces of inter-function definition data included in the program before change based on the plurality of pieces of UI definition data included in the correction program. The inter-function definition data correcting unit 365 includes: a target determining unit 391; and a change unit 393.

The target determining unit 391 determines UI definition data not included in the correction program among the plurality of pieces of UI definition data included in the program before change as the deleted UI definition data and determines UI definition data not included in the program before change among the plurality of pieces of UI definition data included in the correction program as the added UI definition data. The target determining unit 391 outputs the deleted UI definition data and the added UI definition data to the change unit 393.

The change unit 393 deletes inter-function definition data corresponding to the deleted UI definition data among a plurality of pieces of inter-function definition data included in the program before change by using the plurality of pieces of inter-function definition data included in the program before change as a reference. The inter-function data, in two or more related functions selected from among a plurality of functions included in the MFP 100A, determines a set of a setting value set for a first related function among the two or more related functions, a setting value that cannot be set in a second related function other the first related function among the two or more related functions, and a setting value that can be set in the second related function. In a case where, among the plurality of pieces of inter-function definition data included in the correction program, inter-function definition data defining a function corresponding to the deleted UI definition data as the first related function and the second related function is present, and a setting value defined in the inter-function definition data includes one of one or more setting values that can be set in the deleted UI definition data, the inter-function definition data is deleted from the correction program.

In addition, the change unit 393 extracts inter-function definition data corresponding to the added UI definition data from among the plurality of pieces of inter-function definition data included in the definition database and adds the extracted inter-function definition data to the correction program. In a case where, among the plurality of pieces of function definition data included in the definition database stored in the HDD 305, inter-function definition data defining a function corresponding to the added UI definition data as the first related function and the second related function is present, and the setting value defined in the inter-function definition data includes one of one or more setting values that can be set in the added UI definition data, the inter-function definition data is added to the correction program.

The change unit 393 stores the correction program after the change of the inter-function definition data in the HDD 305 and outputs the correction program to the alternative generation unit 363.

The alternative generation unit 363 receives the correction program after the change of the inter-function definition data from the change unit 393 as an input and receives the control information from the control information generation unit 361 as an input. When an alternative direction is input from the user notification unit 367, the alternative generation unit 363 deletes a description relating to the UI definition data specified by the prohibition information included in the control information that is included in the command definition data specified by the command definition data identification information included in the control information, thereby generating alternative command definition data. The alternative generation unit 363 replaces the command definition data specified by the command definition data identification information included in the control information that is included in the correction program with the alternative command definition data, thereby generating a new driver program. Hereinafter, the driver program generated by the alternative generation unit 363 will be referred to as an alternative program. In a case where the alternative program is generated, the alternative generation unit 363 stores the alternative program in the HDD 305.

Figure 13:
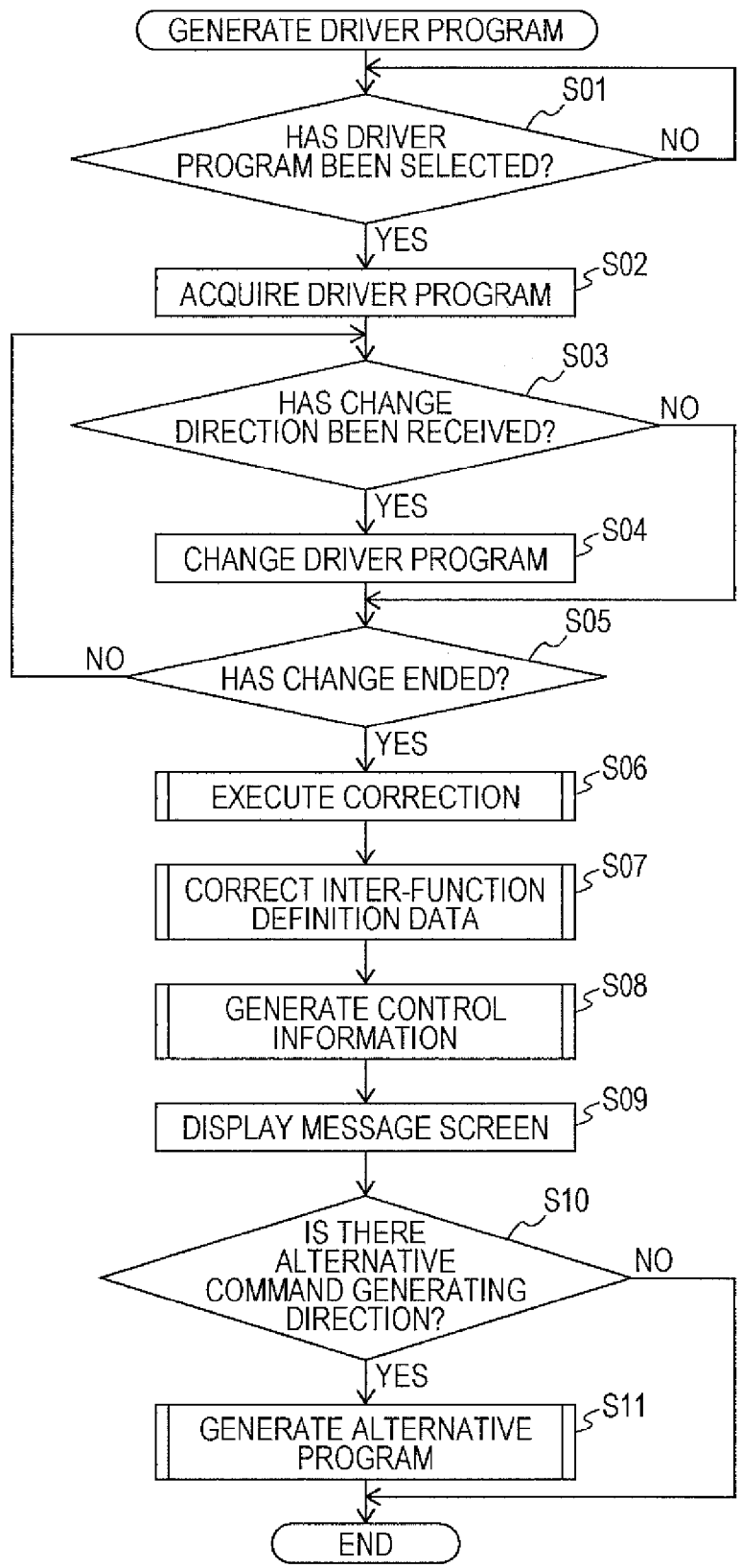
FIG. 13 is a flowchart that illustrates an example of the flow of a driver program generating process in accordance with one or more embodiments of the invention.

FIG. 13 is a flowchart that illustrates an example of the flow of a driver program generating process in accordance with one or more embodiments of the invention. The driver program generating process is a process executed by the CPU 301 as the CPU 301 included in the server 300 executes a driver program generating program stored in the ROM 302, the HDD 305, or the CD-ROM 309A. As illustrated in FIG. 13, the CPU 301 determines whether or not the selection of a driver program is received in Step S01. It is determined whether or not an operation of selecting one of four driver programs controlling the MFPs 100A to 100D stored in the HDD 305 has been received by the operation unit 307. A standby state is formed until the selection of a driver program is received, and, when the selection of a driver program is received, the process proceeds to Step S02.

In Step S02, the driver program selected by the user is acquired by reading the driver program from the HDD 305. Then, it is determined whether or not a change direction has been received. It is determined whether or not a change direction for changing a plurality of pieces of UI definition data and a plurality of pieces of command definition data included in the driver program acquired in Step S02 has been received by the operation unit 307. In a case where the change direction has been received, the process proceeds to Step S04. Otherwise, Step S04 is skipped, and the process proceeds to Step S05. The change direction includes a direction for deleting the UI definition data, a direction for adding one of the plurality of pieces of UI definition data included in the definition database, a direction for deleting the command definition data, and a direction for adding one of the plurality of pieces of command definition data included in the definition database. In Step S04, according to the change direction received in Step S03, the driver program is changed, and the process proceeds to Step S05. Hereinafter, the driver program before the change made in Step S04 will be referred to as the program before change, and the driver program after the change will be referred to as the program after change.

In Step S05, it is determined whether or not the operation of changing the driver program has ended. When the user inputs an operation for ending the change direction using the operation unit 307, it is determined that the operation of changing the driver program has been ended. In a case where the operation of changing the driver program has ended, the process proceeds to Step S06. Otherwise, the process is returned to Step S03.

In Step S06, a correction process is executed, and the process proceeds to Step S07. While the correction process will be described in detail later, the correction process is a process of correcting the plurality of pieces of command definition data included in the driver program changed in Step S04.

In Step S07, an inter-function definition data correcting process is executed, and the process proceeds to Step S08. While the inter-function definition data correcting process will be described later in detail, the inter-function definition data correcting process is a process of correcting the inter-function definition data included in the correction program corrected in Step S06.

In Step S08, a control information generating process is executed, and the process proceeds to Step S09. While the control information generating process will be described later in detail, the control information generating process is a process of generating the control information based on the driver program corrected in Step S06. The control information includes command definition data identification information used for identifying the command definition data and prohibition information representing that a determination on whether or not the setting value has been set is not executed based on the UI definition data not included in the program after the correction.

In Step S09, a message screen is displayed on the display unit 306, and the process proceeds to Step S10. The message screen includes the command definition data identification information included in the control information generated in Step S08 and a description relating to the UI definition data specified by the prohibition information included in the control information that is included in the command definition data specified by the command definition data identification information.

In the next Step S10, it is determined whether or not an alternative command generating direction has been received. The alternative command generating direction is an operation for directing the generation of alternative command definition data acquired by changing the command definition data based on the control information. In a case where the alternative command generating direction has been received, the process proceeds to Step S11. Otherwise, the process ends.

In Step S11, an alternative program generating process is executed, and the process ends. While the alternative program generating process will be described later in detail, the alternative program generating process is a process of generating alternative command definition data by changing the command definition data based on the control information and replacing the command definition data included in the program after the correction with the alternative command data.

Figure 14:
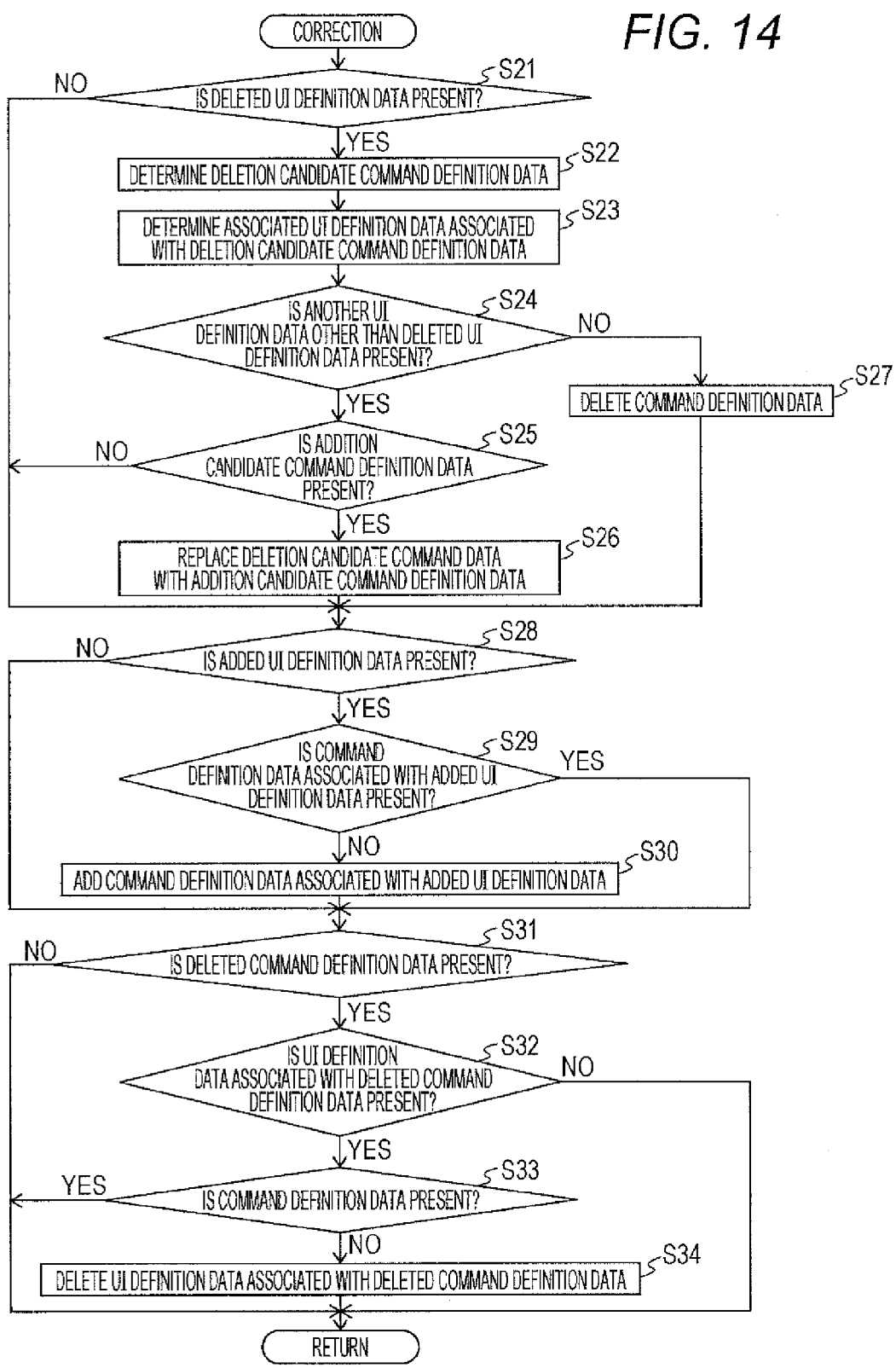
FIG. 14 is a flowchart that illustrates an example of the flow of a correction process in accordance with one or more embodiments of the invention.

FIG. 14 is a flowchart that illustrates an example of the flow of a correction process in accordance with one or more embodiments of the invention. The correction process is a process executed in Step S06 of the driver program changing process illustrated in FIG. 13. As illustrated in FIG. 14, it is determined whether or not deleted UI definition data is present in Step S21. The deleted UI definition data is UI definition data that is included in the program before change but is not included in the program after change. In a case where the deleted UI definition data is present, the process proceeds to Step S22. Otherwise, the process proceeds to Step S28.

In Step S22, deletion candidate command definition data is determined. The deletion candidate command definition data is command definition data associated with the deleted UI definition data based on the first association information included in the definition database.

In the next Step S23, related UI definition data relating to the deletion candidate command definition data is determined. The related UI definition data is UI definition data associated with the deletion candidate command definition data based on the second association information included in the definition database.

In the next Step S24, it is determined whether or not UI definition data other than the deleted UI definition data specified in Step S21 is included in the related UI definition data determined in Step S23. In a case where the related UI definition data includes UI definition data other than the deleted UI definition data, the process proceeds to Step S25. Otherwise, the process proceeds to Step S27. In Step S27, the deletion candidate command definition data determined in Step S22 is deleted from the program after change, and the process proceeds to Step S28.

In Step S25, it is determined whether or not addition candidate command definition data is present in the definition database. The addition candidate command definition data is command definition data associated with all the related UI definition data based on the second association information. In a case where the addition candidate command data is present, the process proceeds to Step S26. Otherwise, Step S26 is skipped, and the process proceeds to Step S28. In Step S26, the deletion candidate command data included in the program after change is replaced with the addition candidate command data determined in Step S25. In other words, the deletion candidate command data is deleted from the program after change, and the addition candidate command data is added to the program after change.

In Step S28, it is determined whether or not added UI definition data is present. The added UI definition data is UI definition data that is included in the program after change but is not included in the program before change. In a case where the added UI definition data is present, the process proceeds to Step S29. Otherwise, the process proceeds to Step S31.

In Step S29, it is determined whether or not the command definition data associated with the added UI definition data based on the first association information is included in the program after change. In a case where the command definition data is not included in the program after change, the process proceeds to Step S30. In a case where the command definition data is included in the program after change, Step S30 is skipped, and the process proceeds to Step S31. In Step S30, in a case where the command definition data associated with the added UI definition data based on the first association information is not present in the program after change, the command definition data associated with the added UI definition data based on the first association information is extracted from the definition database and adds the extracted command definition data to the program after change.

In Step S31, it is determined whether or not deleted command definition data is present. The deleted command definition data is command definition data that is not included in the program after change but is included in the program before change. In a case where the deleted command definition data is present, the process proceeds to Step S32. Otherwise, the process ends.

In Step S32, it is determined whether or not UI definition data associated with the deleted command definition data based on the second association information is included in the program after change. In a case where the UI definition data associated with the deleted command definition data based on the second association information is included in the program after change, the process proceeds to Strep S33. Otherwise, the process is returned to the driver program generating process. In Step S33, it is determined whether or not the command definition data associated with the UI definition data, which is associated with the deleted command definition data based on the second association information, based on the first association information is included in the program after change. In a case where such command definition data is included in the program after change, the process is returned to the driver program generating process. Otherwise, the process proceeds to Step S34.

In Step S34, the UI definition data associated with the deleted command definition data based on the second association information is deleted from the program after change, and the process is returned to the driver program generating process.

Figure 15:
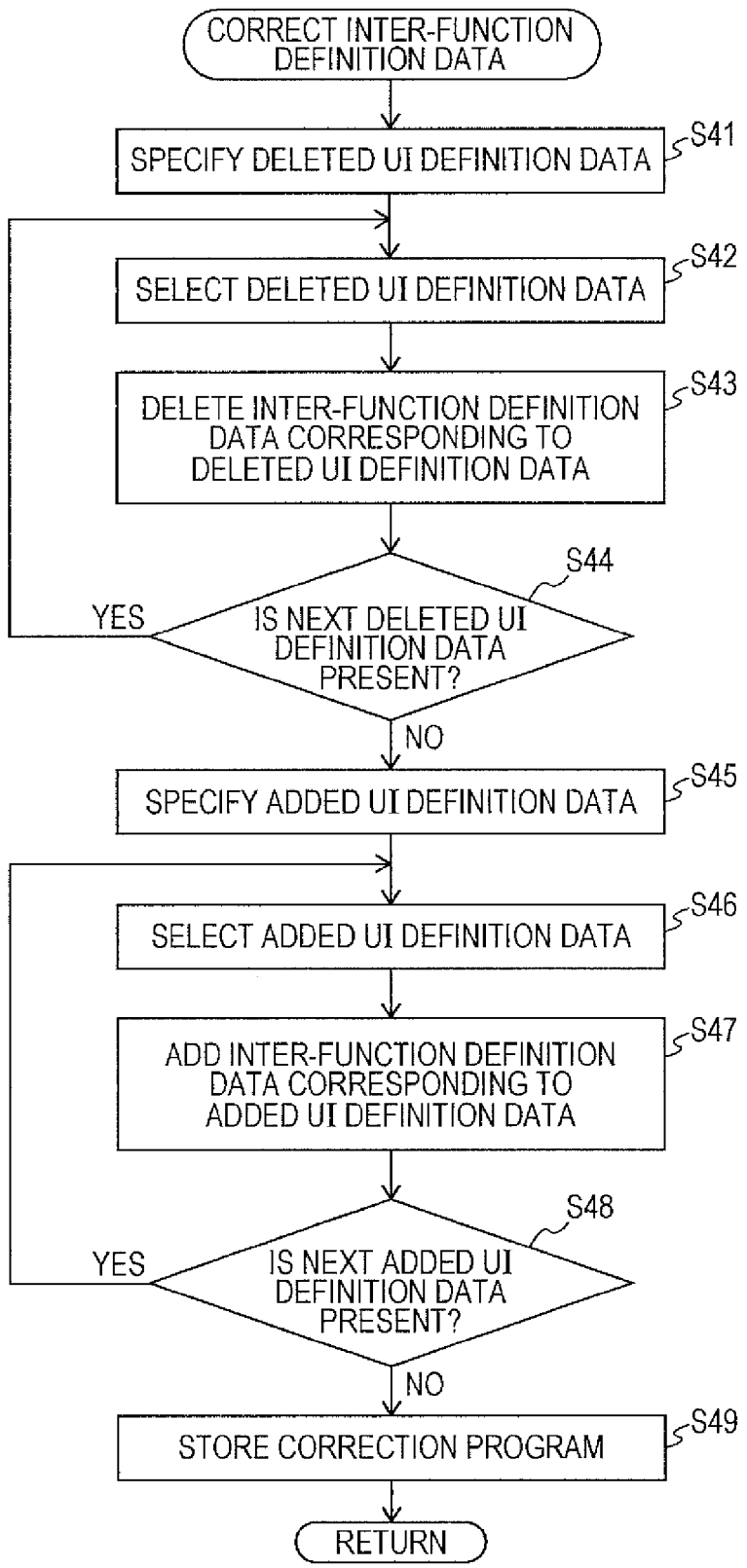
FIG. 15 is a flowchart that illustrates an example of the flow of an inter-function definition data correcting process in accordance with one or more embodiments of the invention.

FIG. 15 is a flowchart that illustrates an example of the flow of an inter-function definition data correcting process in accordance with one or more embodiments of the invention. The inter-function definition data correcting process is a process that is executed in Step S07 of the driver program changing process illustrated in FIG. 13. In a step before the execution of the process of Step S07, a correction program is generated by the correction process executed in Step S06. As illustrated in FIG. 15, the CPU 301 specifies one or more pieces of deleted UI definition data in Step S41. The deleted UI definition data is UI definition data that is included in the program before change but is not included in the correction program. In the next Step S42, one piece of deleted UI definition data that is a processing target is selected from among one or more pieces of deleted UI definition data. Then, inter-function definition data corresponding to the selected deleted UI definition data is deleted from the correction program in Step S43. The inter-function definition data, for two or more related functions selected from the plurality of functions included in the MFP 100A, defines a set of a setting value set for a first related function among the two or more related functions, a setting value that cannot be set in a second related function other than the first related function among the two or more related functions, and a setting value that can be set in the second related function. In a case where inter-function definition data defining a function corresponding to the deleted UI definition data as the first related function and the second related function is present, and a setting value defined in the inter-function definition data includes one of one or more setting values that can be set in the deleted UI definition data, the inter-function definition data is deleted from the correction program.

In Step S44, it is determined whether or not deleted UI definition data that is not selected as the processing target in Step S42 is present. In a case where the undeleted UI definition data that has not been processed is present, the process is returned to Step S42. Otherwise, the process proceeds to Step S45.

In Step S45, one or more pieces of added UI definition data are specified in Step S41. The added UI definition data is UI definition data that is not included in the program before change but is included in the correction program. In the next Step S46, one piece of added UI definition data that is a processing target is selected from among one or more pieces of added UI definition data. Then, inter-function definition data corresponding to the selected added UI definition data is added to the correction program in Step S44. In the definition database stored in the HDD 305, in a case where inter-function definition data defining a function corresponding to the added UI definition data as the first related function and the second related function is present, and the setting value defined in the inter-function definition data includes one of one or more setting values that can be set in the added UI definition data, the inter-function definition data is added to the correction program.

In Step S48, it is determined whether or not added UI definition data that is not selected as a processing target in Step S46 is present. In a case where added UI definition data that has not been processed is present, the process is returned to Step S46. Otherwise, the process proceeds to Step S49.

In Step S49, the correction program after the change of the inter-function definition data is stored in the HDD 305, and the process is returned to the driver program generating process.

Figure 16:
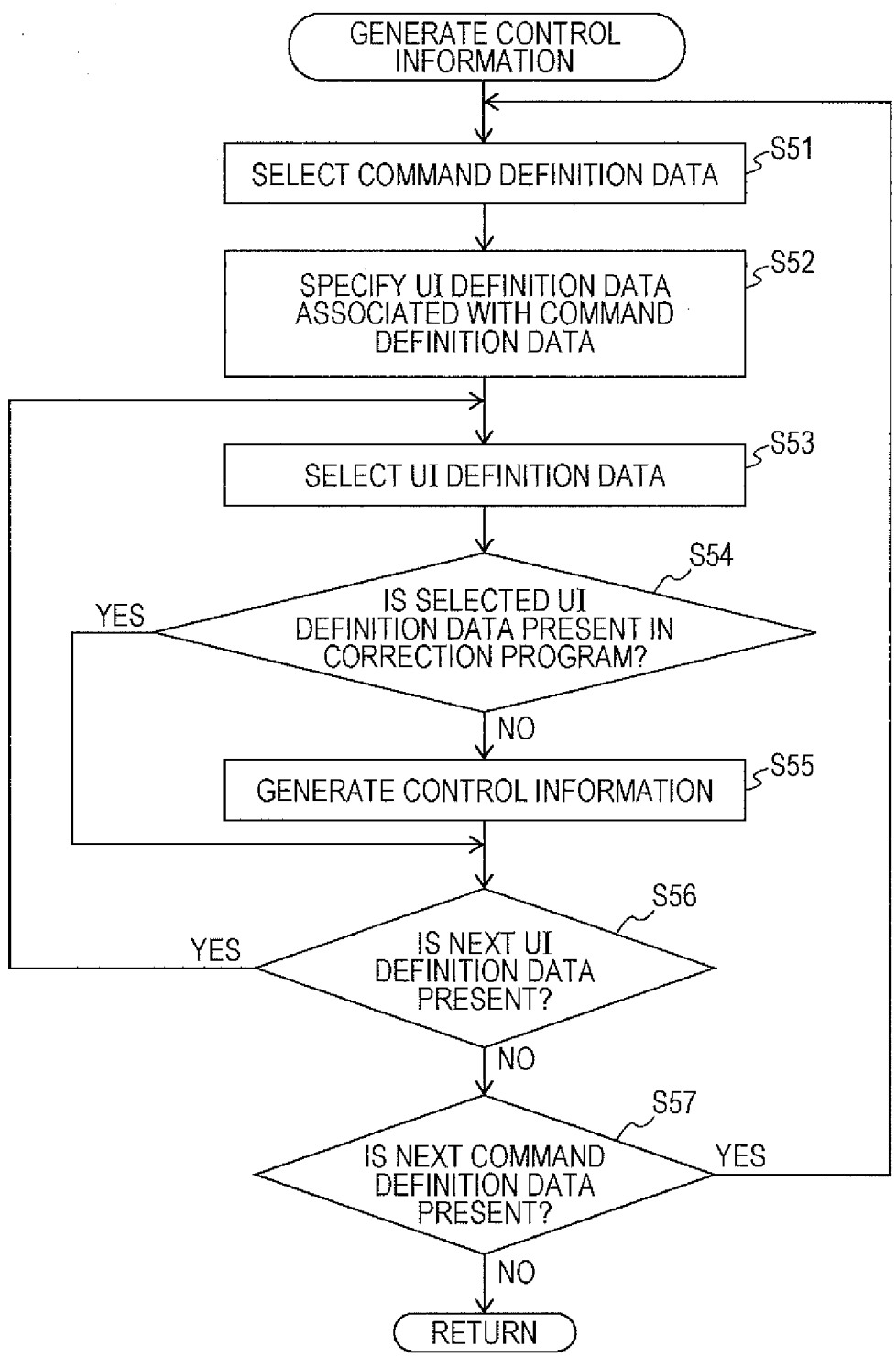
FIG. 16 is a flowchart that illustrates an example of the flow of a control information generating process in accordance with one or more embodiments of the invention.

FIG. 16 is a flowchart that illustrates an example of the flow of a control information generating process in accordance with one or more embodiments of the invention. The control information generating process is a process that is executed in Step S08 of the driver program changing process illustrated in FIG. 13. In a step before the execution of the process of Step S08, the correction program is generated by the correction process executed in Step S06. As illustrated in FIG. 16, one piece of command definition data that is a processing target is selected from among a plurality of pieces of command definition data included in the correction program in Step S51. In the next Step S52, all of the UI definition data that is associated with the command definition data based on the second association information are specified. Then, one piece of UI definition data that is a processing target is selected from among the specified UI definition data in Step S53. In Step S54, it is determined whether or not the selected UI definition data is included in the correction program. In a case where the selected UI definition data is not included in the correction program, the process proceeds to Step S55. On the other hand, in a case where the selected UI definition data is included in the correction program, Step S55 is skipped, and the process proceeds to Step S56. In Step S55, control information is generated. The control information includes command definition data identification information used for identifying the command definition data selected in Step S51 and prohibition information representing that a determination on whether or not a setting value is set based on the UI definition data selected in Step S53 is not executed.

In Step S56, it is determined whether or not UI definition data that is not selected as the processing target in Step S53 is present. In a case where UI definition data that has not been processed is present, the process is returned to Step S53. Otherwise, the process proceeds to Step S57. In Step S57, it is determined whether or not command definition data that is not selected as the processing target in Step S51 is present. In a case where the command definition data that has not been processed is present, the process is returned to Step S51. Otherwise, the process is returned to the driver program generating process.

Figure 17:
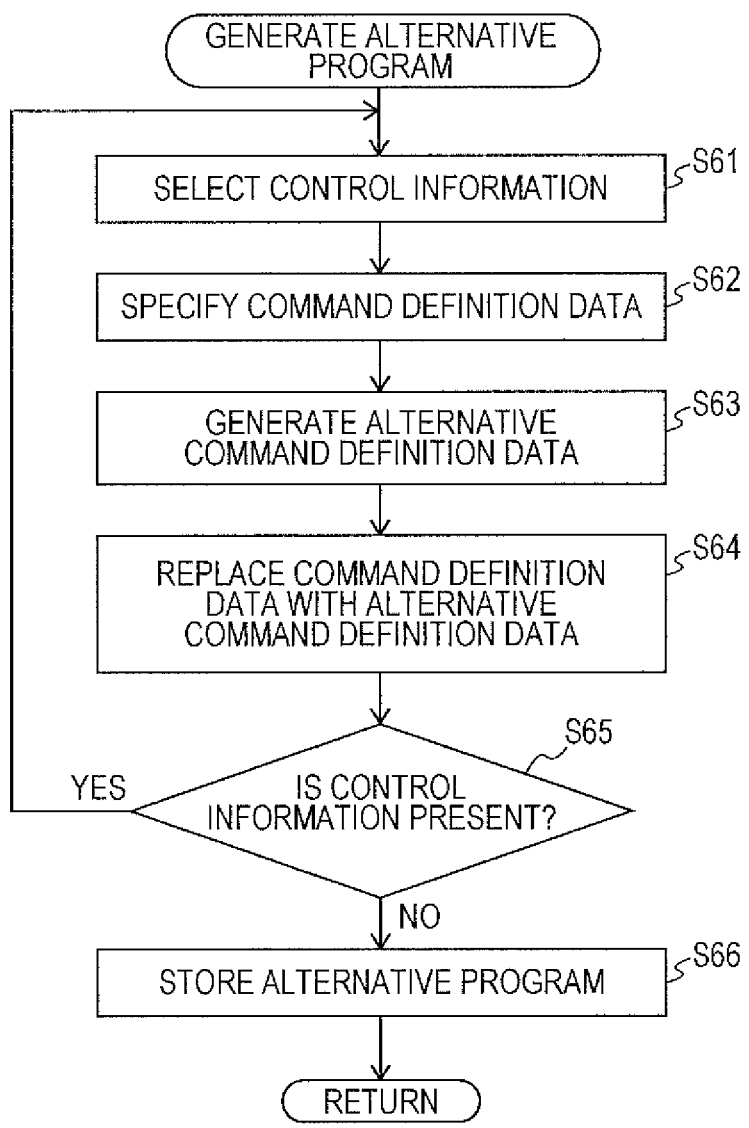
FIG. 17 is a flowchart that illustrates an example of the flow of an alternative program generating process in accordance with one or more embodiments of the invention.

FIG. 17 is a flowchart that illustrates an example of the flow of the alternative program generating process in accordance with one or more embodiments of the invention. The alternative program generating process is a process that is executed in Step S11 of the driver program changing process illustrated in FIG. 13. In a step before the execution of the process of Step S11, the correction program is generated by the correction process executed in Step S06, and the control information is generated by the control information generating process executed in Step S08. The control information includes the command definition data identification information and prohibition information representing that a determination on whether or not a setting value is set based on the UI definition data is not executed.

As illustrated in FIG. 17, the CPU 301 selects one piece of control information to be a processing target in Step S61. Then, command definition data is specified based on the command definition data identification information included in the control information in Step S62. This command definition data is included in the correction program. In the next Step S63, alternative command definition data is generated. More specifically, the alternative command definition data is generated by deleting a description relating to the UI definition data specified by the prohibition information included in the control information in the command definition data specified in Step S62.

In the next Step S64, the command definition data specified in Step S62, which is included in the correction program, is replaced with the alternative command definition data generated in Step S64. In other words, the command definition data specified in Step S62 is deleted from the correction program, and the alternative command definition data generated in Step S63 is added to the correction program.

In the next Step S65, it is determined whether or not control information that is not selected as the processing target in Step S61 is present. In a case where the control information that has not been processed is present, the process is returned to Step S61. Otherwise, the process proceeds to Step S66.

In Step S66, the correction program after the replacement of the command definition data included in the correction program with the alternative command definition data is stored in the HDD 305 as the alternative program, and the process is returned to the driver program generating process.

Figure 18:
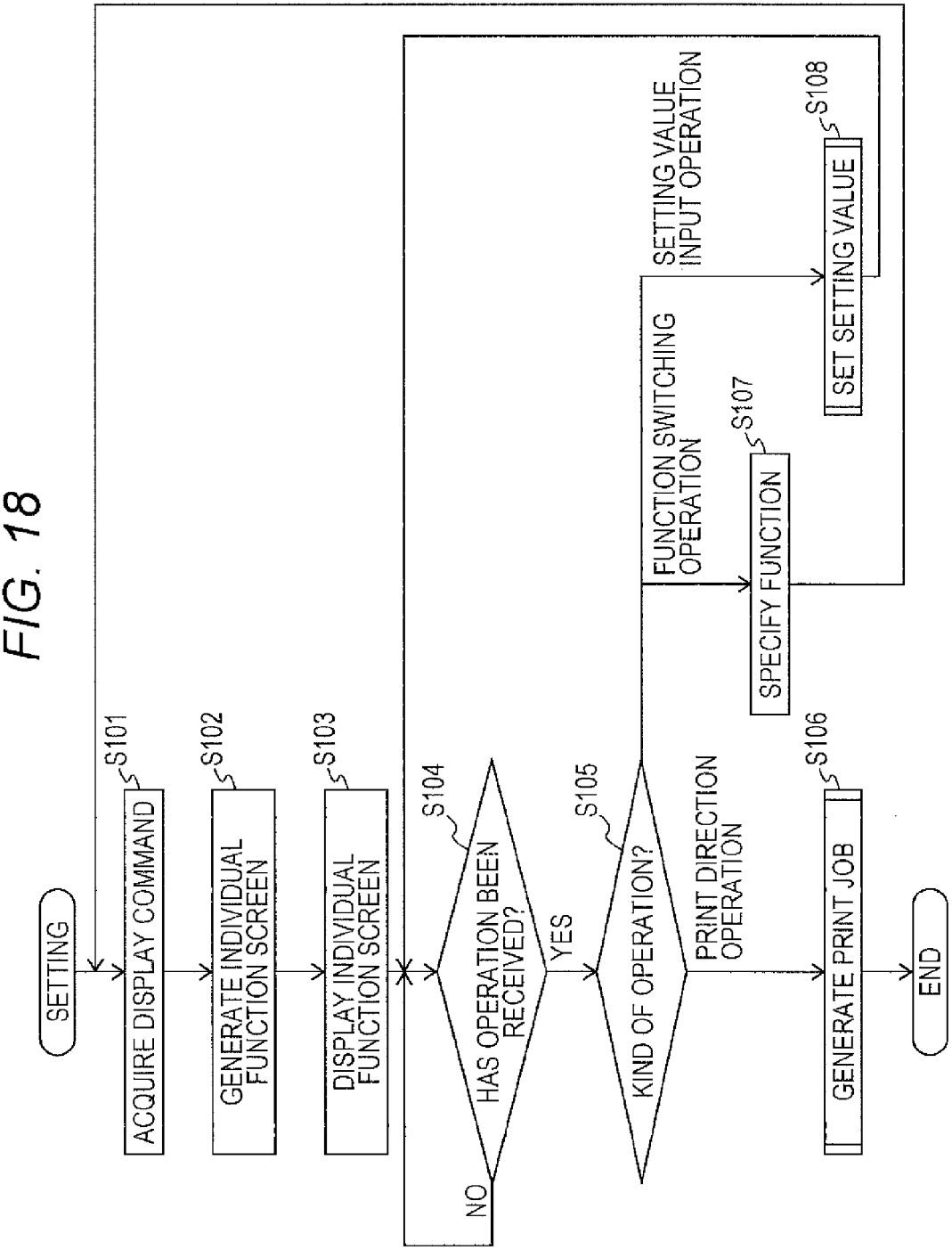
FIG. 18 is a flowchart that illustrates an example of the flow of a setting process in accordance with one or more embodiments of the invention.

FIG. 18 is a flowchart that illustrates an example of the flow of a setting process in accordance with one or more embodiments of the invention. The setting process is a process that is executed by the CPU 201 as the CPU 201 included in the PC 200A executes the driver program corresponding to the MFP 100A that is stored in the HDD 205. As illustrated in FIG. 18, the CPU 201 reads UI definition data corresponding to a function that is the processing target among the function definition data 93 included in the driver program corresponding to the MFP 100A that is stored in the HDD 205 and acquires a display command included in the read UI definition data in Step S101. In the next Step S102, an individual function screen is generated according to the display command acquired in Step S101. More specifically, the individual function screen is generated by arranging components specified by component specifying information included in the display command at positions specified by position information included in the display command within the screen displayed by the display unit 206.

Next, in Step S103, the individual function screen is displayed on the display unit 206. Then, it is determined whether or not an operation has been received in Step S104. Until an operation is input to the operation unit 207 by the user, a standby state is formed (No in Step S104), and, when an operation input to the operation unit 207 is detected (Yes in Step S104), the process proceeds to Step S105. In Step S105, the process is branched based on a received operation. The process proceeds to Step S106 in a case where the operation is an operation of directing a print operation, the process proceeds to Step S107 in a case where the operation is an operation for switching the function, and the process proceeds to Step S108 in a case where the operation is an operation of inputting a setting value.

In Step S106, a print job generating process is executed, and the process ends. The print job generating process will be described later in detail. In Step S107, a function specified by the operation received in Step S104 is set as a processing target, and the process is returned to Step S101. In Step S108, a setting value setting process is executed, and the process is returned to Step S104.

Figure 19:
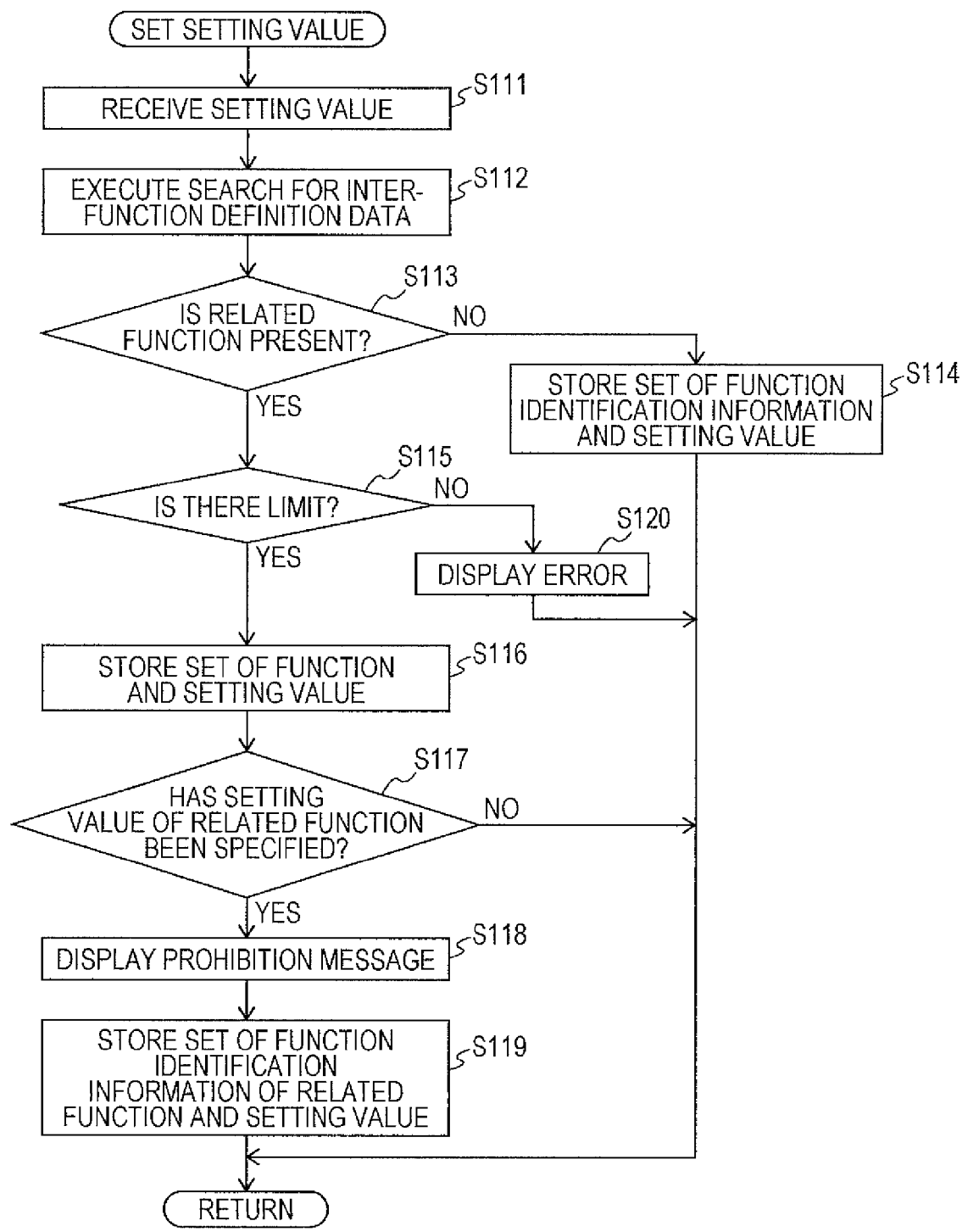
FIG. 19 is a flowchart that illustrates an example of a setting value setting process in accordance with one or more embodiments of the invention.

FIG. 19 is a flowchart that illustrates an example of the setting value setting process in accordance with one or more embodiments of the invention. The setting value setting process is a process that is executed in Step S108 illustrated in FIG. 18. As illustrated in FIG. 19, a setting value input by the user to the operation unit 207 is received in Step S111. Then, a search for the inter-function definition data 95 stored in the HDD 205 is executed in Step S112. Search keys are the function identification information of the function set as the processing target and the setting value received in Step S111. Then, it is determined whether or not a related function is present based on a result of the search in Step S113. In a case where inter-function definition data 95 including the function identification information of the function set as the processing target and the setting value received in Step S111 is present, it is determined that the related function is present, the inter-function definition data 95 is specified, and the process proceeds to Step S115. Otherwise, the process proceeds to Step S114. In Step S114, a set of the function identification information used for identifying the function set as the processing target and the setting value received in Step S111 is temporarily stored in the RAM 203, and the process is returned to the setting process.

Meanwhile, in Step S115, it is determined whether or not the input of the setting value received in Step S111 is limited based on the inter-function definition data 95 specified in Step S113. In a case where the input of the setting value is limited, the process proceeds to Step S120. On the other hand, in a case where the input of the setting value is not limited, the process proceeds to Step S116. In the inter-function definition data 95 specified in Step S113, in a case where the function set as the processing target is defined as the second related function, the setting value received in Step S21 is the same as the setting value corresponding to the second related function, and the first related function and the first setting value corresponding thereto are stored in the RAM 203 and are already been set, it is determined that the input of the setting value is determined to be limited. The first related function and the setting value corresponding thereto are stored in the RAM 203 in a case where the process of Step S116 is executed.

In Step S120, an error message is displayed on the display unit 206, and the process is returned to the setting process. At this time, the setting value received in Step S111 is discarded.

In Step S116, similar to Step S114, a set of the function identification information used for identifying the function set as the processing target and the setting value received in Step S21 is temporarily stored in the RAM 203, and the process proceeds to Step S117.

In the next Step S117, it is determined whether or not a setting value of the related function is specified. In a case where the setting value of the related function is specified, the process proceeds to Step S118. Otherwise, the process is returned to the setting process. In the inter-function definition data 95 specified in Step S113, in a case where the function set as the processing target coincides with the first related function, and the setting value received in Step S111 coincides with the first setting value corresponding to the first related function, it is determined that the setting value of the related function is specified.

In Step S118, a prohibition message is specified according to a message display command included in the inter-function definition data 95 specified in Step S113, the specified prohibition message is displayed on the display unit 206, and the process proceeds to Step S119. The prohibition message is a message used for notifying the user of setting of the second setting value for the second related function.

In the next Step S119, a set of the related function and the setting value is stored in the RAM 203, and the process is returned to the setting process. A set of the second related function of the inter-function definition data 95 specified in Step S113 and the second setting value corresponding to the second related function is stored in the RAM 203.

Figure 20:
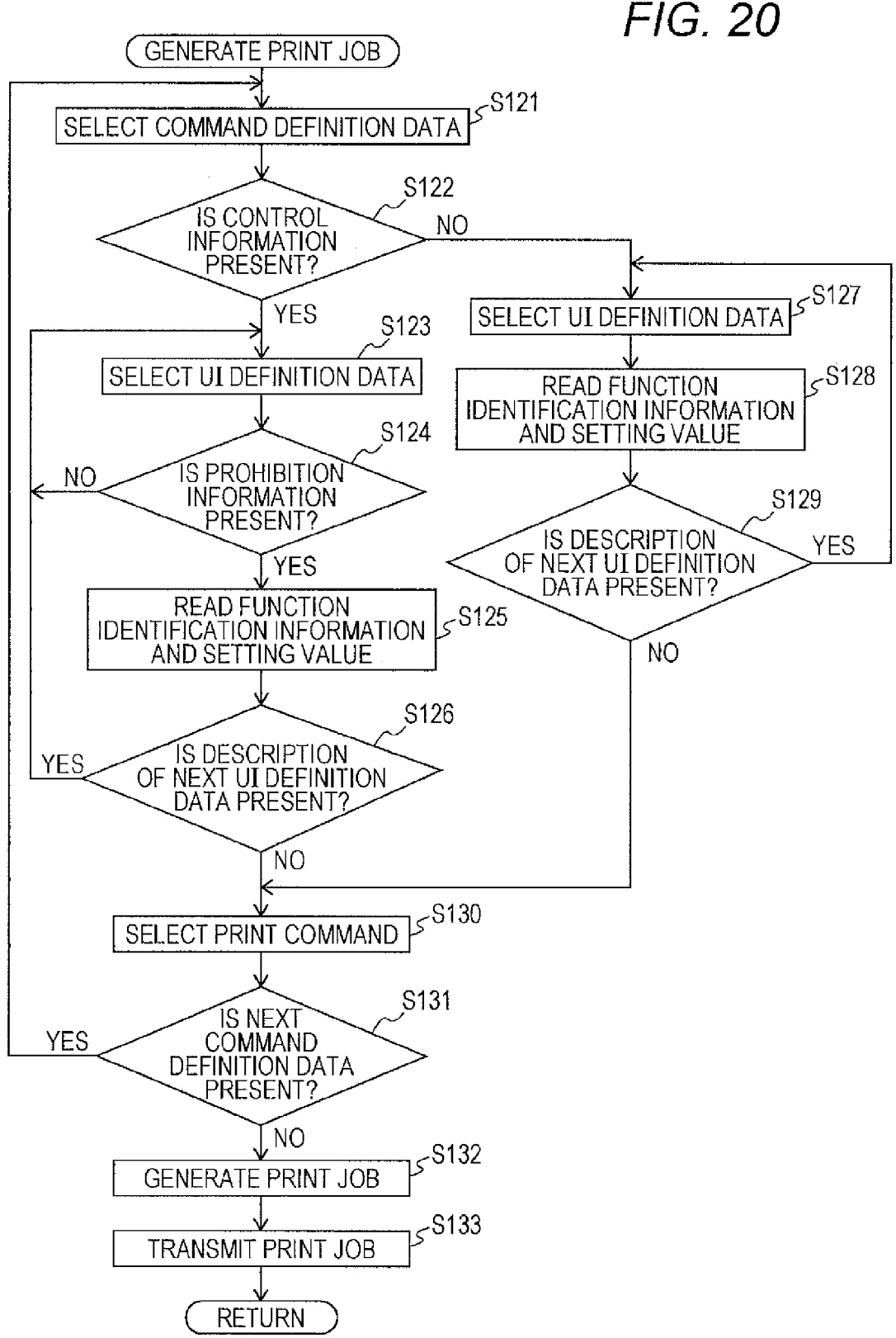
FIG. 20 is a flowchart that illustrates an example of the flow of a print job generating process in accordance with one or more embodiments of the invention.

FIG. 20 is a flowchart that illustrates an example of the flow of a print job generating process in accordance with one or more embodiments of the invention. The print job generating process is a process that is executed in Step S106 illustrated in FIG. 18. As illustrated in FIG. 20, the CPU 201 selects one from among a plurality of pieces of command definition data included in the printer driver program corresponding to the MFP 100A that is stored in the HDD 205 in Step S121. Then, one that becomes the processing target is selected from among one or more pieces of UI definition data described in the command definition data in Step S122.

In the next Step S122, it is determined whether or not control information is present. It is determined whether or not control information including the command definition data of the command definition data selected in Step S122 is included in the printer driver program corresponding to the MFP 100A that is stored in the HDD 205. In a case where the control information is present, the process proceeds to Step S123. Otherwise, the process proceeds to Step S127.

In Step S123, one or more pieces of UI definition data described in the command definition data selected in Step S121 are selected. Then, it is determined whether or not the control information read in Step S122 includes prohibition information representing that a determination on whether or not the setting value is set based on the UI definition data selected in Step S123 is not executed in Step S124. In a case where such prohibition information is included therein, the process is returned to Step S123. Otherwise, the process proceeds to Step S125. In Step S125, the function identification information used for identifying a function corresponding to the UI definition data selected in Step S123 and the setting value set by executing the setting value setting process described in FIG. 19 for the UI definition data are read from the RAM 203. These are stored in the RAM 203 in Step S114 or Step S116 illustrated in FIG. 19. In the next Step S126, it is determined whether or not UI definition data that is not selected as the processing target in Step S123 is present. In a case where the UI definition data that has not been processed is present, the process is returned to Step S123. Otherwise, the process proceeds to Step S130.

In Step S127, one or more pieces of UI definition data described in the command definition data selected in Step S121 are selected. Then, the setting values set by executing the setting value setting process described with reference to FIG. 19 for the function identification information used for identifying the function corresponding to the selected UI definition data and the UI definition data thereof are read from the RAM 203 in Step S128. These are stored in the RAM 203 in Step S114 or Step S116 illustrated in FIG. 19. In the next Step S129, it is determined whether or not UI definition data that is not selected as the processing target in Step S127 is present. In a case where the UI definition data that has not been processed is present, the process is returned to Step S127. Otherwise, the process proceeds to Step S130.

In Step S130, a print command corresponding to a set of the function identification information and the setting value read in Step S125 or Step S128 is selected. In the next Step S131, it is determined whether or not command definition data that is not selected as the processing target in Step S121 is present. In a case where the command definition data that has not been processed is present, the process is returned to Step S121. Otherwise, the process proceeds to Step S132.

In Step S132, a print job is generated. The print job that includes all the print commands stored in the RAM 203 and data to be processed is generated. Then, the generated print job is transmitted to the MFP 100A through the network I/F 204 in Step S133, and the process is returned to the setting process.

In embodiments described above, a case has been described as an example in which the definition database is stored in the server 300, and the driver program is generated by the server 300, it may be configured such that the definition database stored in the server 300 is accessible from the PCs 200A and 200B, and the driver program is generated by any one of the PCs 200A and 200B. In such a case, the driver program generating program is executed by any one of the PCs 200A and 200B, and the function illustrated in FIG. 10 is formed in the CPU 201 of the PC executing the driver program out of the PCs 200A and 200B. In addition, the process illustrated in FIGS. 13 to 16 is executed by the CPU 201 of the PC executing the driver program generating program out of the PCs 200A and 200B.

As described above, the server 300 according to this embodiment serves as a driver program generating apparatus and stores the definition database including: the plurality of pieces of UI definition data and the plurality of pieces of command definition data; the first association information associating each of the plurality of pieces of UI definition data with one of the plurality of pieces of command definition data; and the second association information associating each of the plurality of pieces of command definition data with one or more of the plurality of pieces of UI definition data. Then, the program before change designated by the user is acquired from among the driver programs used for controlling the MFPs 100A to 100D, and the program after change acquired by changing the plurality of pieces of UI definition data and the plurality of pieces of command definition data included in the program before change according to a user's direction is generated. More specifically, UI definition data designated by the user is deleted among the plurality of pieces of UI definition data included in the program before change, and UI definition data designated by the user among the plurality of pieces of UI definition data included in the definition database is added to the program before change. Then, in order to match a combination of a plurality of pieces of UI definition data and a plurality of pieces of command definition data included in the program after change with the association determined based on the first association information and the second association information, by changing a part of the plurality of pieces of command definition data included in the program after change, a correction program is generated. Accordingly, the plurality of pieces of UI definition data and the plurality of pieces of command definition data included in the correction program can be matched with each other.

In addition, in a case where command definition data associated with the UI definition data deleted from the program before change in the program after change based on the first association information is associated with one or more pieces of UI definition data other than the deleted UI definition data based on the second association information, command definition data associated with only one or more pieces of UI definition data other than the deleted UI definition data based on the second association information is extracted as candidate command definition data, command definition data corresponding to the deleted UI definition data is deleted, and the candidate command definition data is added. Furthermore, in a case where the command definition data associated with the UI definition data added to the program before change in the program after change based on the first association information is not included in the program after change, command definition data associated with the added UI definition data based on the first association information is added to the program after change. Accordingly, the command definition data associated with the UI definition data included in the program after change can be added.

In addition, in a case where command definition data associated with the UI definition data deleted from the program before change in the program after change based on the first association information is associated with one or more pieces of UI definition data other than the deleted UI definition data based on the second association information, for the command definition data, control information is generated which includes the command definition data identification information used for identifying the command definition data and the prohibition information representing that a determination on whether or not the setting value is set based on the deleted UI definition data is not executed. For this reason, since the control information includes the prohibition information representing that a determination on whether or not the setting value is set based on the deleted UI definition data is not executed, the determination on whether or not the setting value is set can be prevented based on the command definition data associated with the deleted UI definition data. As a result, an unnecessary determination process is not executed by the computer that executes the driver program, and accordingly, a driver program capable of reducing the load can be generated.

Furthermore, a correction program is generated which is acquired by deleting one or more pieces of UI definition data associated with the command definition data deleted from the program before change based on the second association information in the program after change from the program after change under the condition that command definition data associated with the UI definition data based on the first association information is not included in the program after change. Accordingly, since the UI definition data associated with the command definition data that is not included in the program after change can be deleted, the UI definition data of which the setting value does not need to be set can be deleted.

In addition, in a case where all of one or more pieces of UI definition data associated with a plurality of pieces of command definition data included in the correction program based on the second association information are not included in the correction program, control information is generated which includes the command definition data identification information used for identifying the command definition data and the prohibition information representing that a determination on whether or not the setting value is set based on the UI definition data that is not included in the correction program is not executed. For this reason, since the control information includes the prohibition information representing that a determination on whether or not the setting value is set based on the UI definition data that is not included in the correction program is not executed for each of the plurality of pieces of command definition data that are not included in the correction program, the determination on whether or not the setting value is set based on the UI definition data that is not included in the correction program can be prevented based on the plurality of command definition data included in the correction program. As a result, an unnecessary determination process is not executed by the computer that executes the driver program, and accordingly, a driver program capable of reducing the load can be generated.

In addition, since alternative command definition data is generated by deleting a description relating to the UI definition data specified by the prohibition information included in the control information in the command definition data, new command definition data can be easily generated.

In addition, since a plurality of pieces of inter-function definition data included in the program before change are corrected based on a plurality of pieces of UI definition data included in the correction program, based on the plurality of pieces of inter-function definition data, the process of determining whether or not the setting value can be set based on the UI definition data that is not included in the correction program can be prevented. As a result, an unnecessary determination process is not executed by the computer that executes the driver program, and accordingly, a driver program capable of reducing the load can be generated.

In embodiments described above, while the server 300 or the PCs 200A to 200D are described as an example of the driver program generating apparatus, a driver program generating method or a driver program generating program that causes the server 300 or the PCs 200A to 200D to execute the process illustrated in FIGS. 13 to 17.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A server for generating a driver program for an image forming apparatus, comprising:
   a non-transitory computer readable storage medium that stores:
   a driver program of one of a plurality of image forming apparatuses,
   pieces of UI definition data common to the image forming apparatuses,
   pieces of command definition data common to the image forming apparatuses,
   first association information that associates each of the pieces of UI definition data with one of the pieces of command definition data, and
   second association information that associates each of the pieces of command definition data with at least one of the pieces of UI definition data,
   wherein each of the pieces of UI definition data corresponds to one a function of a plurality of functions and defines one or more setting values settable for the function and a display command used for receiving the one or more setting values,
   wherein each of the pieces of command definition data corresponds to a second function of the plurality of functions, corresponds to one or more setting values settable for the second function, and defines one or more print commands common to the image forming apparatuses,
   wherein the server further comprises a processor that:
   obtains a change to a driver program of one of the image forming apparatuses, wherein the driver program comprises at least a piece of the pieces of UI definition data and at least a piece of the pieces of command definition data;
   generates a modified driver program by modifying the at least a piece of the pieces of UI definition data and the at least a piece of the pieces of command definition of the driver program based on the obtained change; and
   generates a correction program by modifying the modified at least a piece of the pieces of command definition data of the modified driver program to match a combination of the pieces of UI definition data and the pieces of command definition data included in the modified driver program based on the first association information and the second association information, and
   wherein generating the correction program comprises adding command definition data associated with added UI definition data based on the first association information to the modified program, and generating the correction program after the obtained change for each of the pieces of the UI definition data, associated with the command definition data deleted from the driver program before the obtained change in the driver program after the obtained change, based on the second association information under a condition that the command definition data associated with the UI definition data based on the first association information be not included in the modified driver program after the obtained change.

2. The server according to claim 1, wherein the processor generates control information comprising:
   command definition data identification information used for identifying the command definition data, and
   prohibition information representing that a determination, on whether the setting value is set based on one or more of the pieces of the UI definition data corresponding to a function corresponding to the command definition data, is not executed for predetermined command definition data among the pieces of command definition data included in the modified driver program.

3. The server according to claim 1,
wherein generating the modified driver program comprises:
deleting at least one of the pieces of UI definition data included in the driver program; and
adding one of the pieces of UI definition data included in the non-transitory computer readable storage medium.

4. The server according to claim 3, wherein generating the correction program further comprises:
extracting command definition data associated with only the UI definition data, other than the deleted piece or pieces of the UI definition data, based on the second association information as candidate command definition data in a case where the command definition data associated with the deleted piece or pieces of the UI definition data is associated with the UI definition data, other than the deleted piece or pieces of the UI definition data based on the second association information in the program after the obtained change;
deleting command definition data corresponding to the deleted piece or pieces of the UI definition data; and
adding the candidate command definition data in a case where the candidate command definition data is extracted, and
wherein the adding command definition data associated with the added UI definition data based on the first association information to the modified program is added after the obtained change in a case where the command definition data associated with the UI definition data added to the modified program before the obtained change in the driver program after the obtained change based on the first association information is not included in the driver program after the obtained change.

5. The server according to claim 4, wherein generating the modified driver program further comprises:
deleting at least one of the pieces of command definition data included in the driver program before the obtained change; and
adding one of the of pieces of command definition data included in the non-transitory computer readable storage medium.

6. The server according to claim 4, wherein generating the control information comprises;
generating control information comprising:
command definition data identification information used for identifying the command definition data, and
prohibition information representing that a determination on whether the setting value is set based on the UI definition data that is not included in the correction program is not executed in a case where none of the pieces of the UI definition data associated with each of the pieces of command definition data included in the correction program based on the second association information is included in the correction program.

7. The server according to claim 2, wherein the processor generates alternative command definition data acquired by deleting a description relating to the UI definition data specified by the prohibition information included in the control information that is included in the command definition data specified by the command definition data identification information included in the generated control information.

8. The server according to claim 1,
wherein the non-transitory computer readable storage medium further stores of pieces of inter-function definition data defining a set of a setting value sets for a first related function among two or more related functions selected from among a plurality of functions included in the image processing apparatus and a setting value that cannot be set in a second related function other than the first related function, and
wherein the driver program before the change further comprises a piece of the plurality pieces of inter-function definition data corresponding to a piece of the pieces of UI definition data included in the driver program before the obtained change,
wherein the processor corrects the piece of the pieces of inter-function definition data included in the driver program before the obtained change, based on the of pieces of UI definition data included in the correction program.

9. The server according to claim 8, wherein correcting the piece of the pieces of inter-function definition data comprises:
determining UI definition data other than the pieces of UI definition data included in the correction program among the pieces of UI definition data included in the driver program before the obtained change as deleted UI definition data and determine UI definition data other than the pieces of UI definition data included in the program before the obtained change among the of pieces of UI definition data included in the correction program after the obtained change as added UI definition data;
deleting inter-function definition data corresponding to the deleted UI definition data among the pieces of inter-function definition data included in the driver program before the obtained change; and
adding inter-function definition data corresponding to the added UI definition data by using the of pieces of inter-function definition data included in the driver program before the obtained change as a reference.

10. A driver program generating method executed by a server, the driver program generating method causing the server to execute:
accessing a non-transitory computer readable storage medium that stores:
pieces of UI definition data,
pieces of command definition data,
first association information that associates each of the pieces of UI definition data with one of the pieces of command definition data, and
second association information that associates each of the pieces of command definition data with one or more of the pieces of UI definition data;
wherein each of the pieces of UI definition data corresponds to a function of a plurality of functions and defines one or more setting values settable for the function and a display command used for receiving the one or more setting values,
wherein each of the pieces of command definition data corresponds to a second function of a plurality of functions, corresponds to one or more setting values settable for the second function, and defines one or more print commands common to a plurality of image forming apparatuses,
acquiring a driver program comprising at least a piece of the pieces of UI definition data and at least a piece of the pieces of command definition data;

generating a modified program, after a change, by changing the pieces of UI definition data and the pieces of command definition data included in the acquired driver program before the change; and changing a piece of the pieces of command definition data included in the modified program after the change to match a combination of the pieces of UI definition data and the pieces of command definition data included in the modified program after the change based on the first association information and the second association information.

11. A non-transitory recording medium storing a computer readable program for generating is a driver program, the computer program causing a computer controlling the server to execute the method according to claim 10.

12. A non-transitory recording medium storing a computer readable program which is a driver program generated using the method according to claim 10, the driver program causing an image processing apparatus to execute:

selecting one of the pieces of UI definition data;

displaying an individual function screen in response to a display command included in the selected UI definition data;

accepting a setting value input by a user according to the displayed individual function screen among setting values included in the UI definition data as a setting value set for a function corresponding to the UI definition data; and generating a print command used for implementing a function in the image processing apparatus by sequentially selecting the command definition data and selecting a print command corresponding to one or more accepted setting values based on one or more pieces of the UI definition data corresponding to the function corresponding to the command definition data among one or more print commands corresponding to the selected command definition data.

* * * * *